United States Patent

Minami et al.

[11] Patent Number: 6,014,472
[45] Date of Patent: Jan. 11, 2000

[54] SPECIAL EFFECT DEVICE, IMAGE PROCESSING METHOD, AND SHADOW GENERATING METHOD

[75] Inventors: Nobuyuki Minami; Akihiro Takashima, both of Kanagawa, Japan

[73] Assignee: Sony Corporation, Tokyo, Japan

[21] Appl. No.: 08/860,067

[22] PCT Filed: Nov. 14, 1996

[86] PCT No.: PCT/JP96/03346

§ 371 Date: Sep. 23, 1997

§ 102(e) Date: Sep. 23, 1997

[87] PCT Pub. No.: WO97/18667

PCT Pub. Date: May 22, 1997

[30] Foreign Application Priority Data

Nov. 14, 1995 [JP] Japan .................................. 7-321230

[51] Int. Cl.[7] .................................................. G06K 9/36
[52] U.S. Cl. ..................... 382/285; 382/154; 345/426; 345/427; 348/578; 348/580
[58] Field of Search ...................... 382/285, 277, 382/276, 293, 153–154; 345/421–427, 419, 422, 430, 138–139, 953, 434–436; 434/43, 33, 38; 348/585–587, 578–582, 44, 123, 631, 590–591

[56] References Cited

U.S. PATENT DOCUMENTS

| 4,041,527 | 8/1977  | Rayner et al. ........................... 348/587 |
| 4,511,337 | 4/1985  | Fortunato et al. ....................... 434/43  |
| 4,586,038 | 4/1986  | Sims et al. .............................. 345/430 |
| 4,819,192 | 4/1989  | Kuragano et al. ....................... 345/421 |
| 4,953,107 | 8/1990  | Hedley et al. .......................... 345/422 |
| 5,327,177 | 7/1994  | DesJardins et al. .................... 348/586 |
| 5,361,100 | 11/1994 | Teece ..................................... 348/578 |
| 5,598,516 | 1/1997  | Mori ....................................... 345/426 |
| 5,616,031 | 4/1997  | Logg ....................................... 434/38 |

FOREIGN PATENT DOCUMENTS

| 2-51789   | 2/1990  | Japan ............................ G06F 15/72 |
| 2-59982   | 2/1990  | Japan ............................ G06F 15/72 |
| 4-225482  | 8/1992  | Japan ............................ G06F 15/72 |
| 4-315274  | 11/1992 | Japan ............................ G06F 15/72 |
| 7-46463   | 2/1995  | Japan ............................ H04N 5/262 |
| 7-65199   | 3/1995  | Japan ............................ G06F 15/72 |
| 2 256 109 | 4/1992  | United Kingdom ............ G06F 15/62 |

*Primary Examiner*—Leo H. Boudreau
*Assistant Examiner*—Ishrat Sherali
*Attorney, Agent, or Firm*—Frommer Lawerence & Haug, LLP; William S. Frommer

[57] ABSTRACT

A virtual 3-D object video signal V1 is produced by performing a 3-D image transformation for a source video signal, and a 2-D objet video signal V2 for virtually representing the 3-D image transformation is produced by projecting the object video signal V1 onto an X-Y plane. Further, 3-D shadow signals V3 and V5 are produced by projecting the 3-D image transformed 3-D object video signal V1 onto a shadow plane, and 2-D shadow signals V4 and V6 corresponding to said 2-D object video signal are produced by projecting the 3-D shadow signals onto the X-Y plane. Therefore, a shadow signal for a 3-D image transformed object video signal can be produced by calculations.

5 Claims, 16 Drawing Sheets

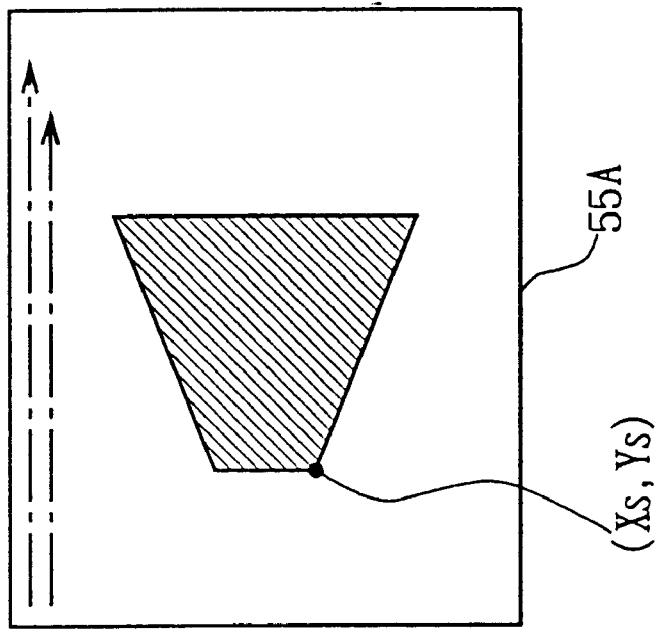
FIG. 5B
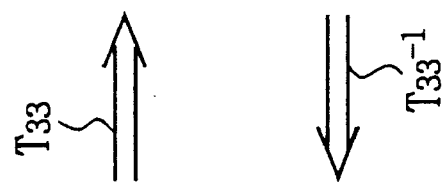
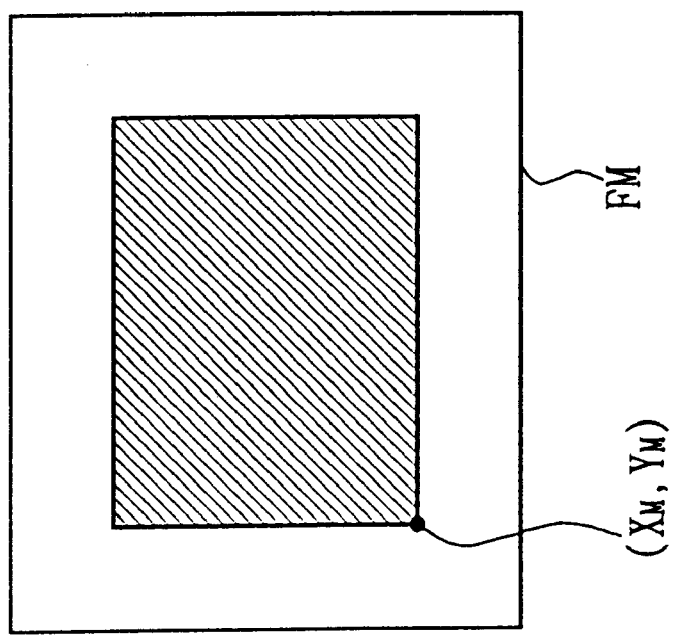
FIG. 5A

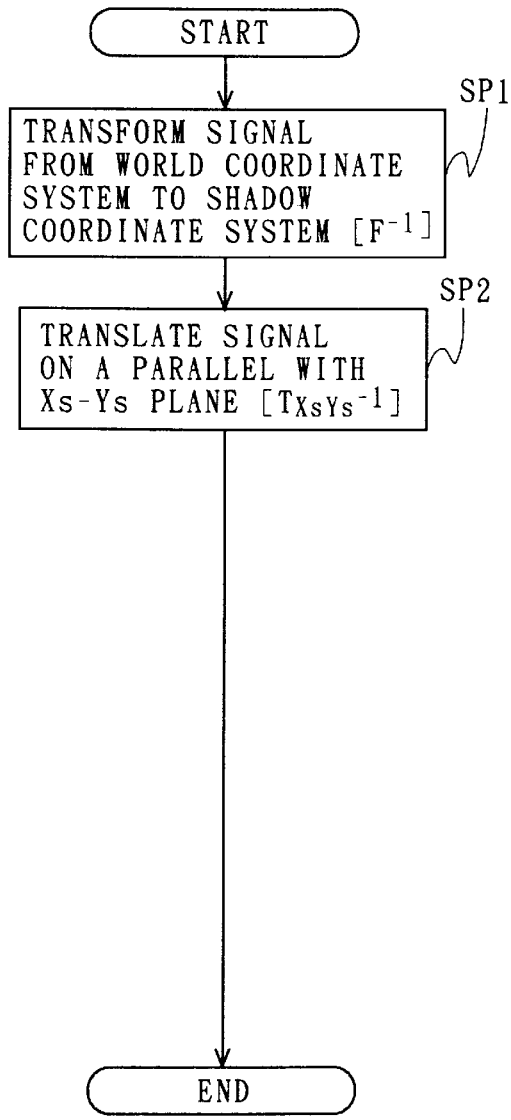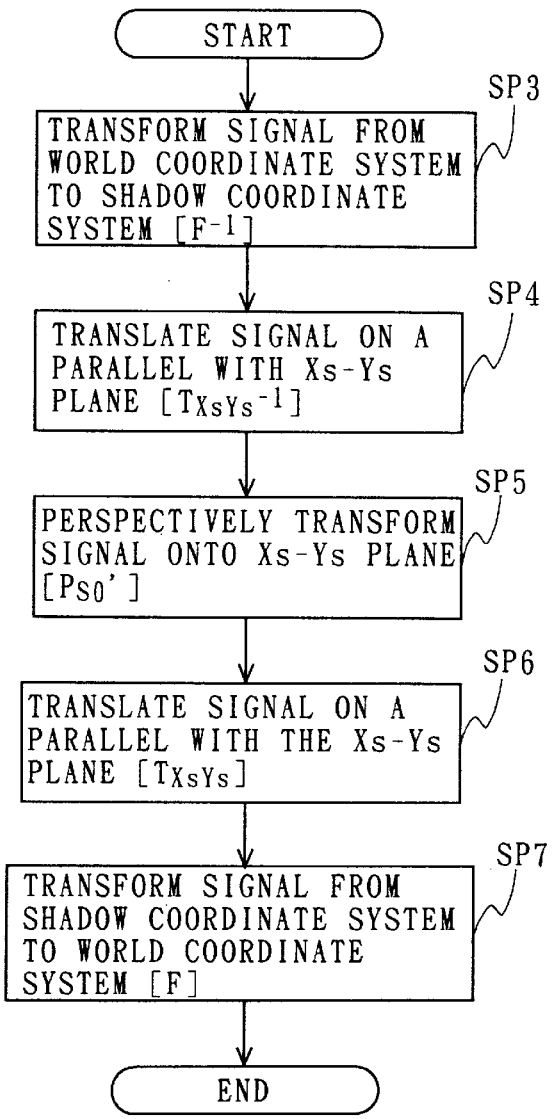
FIG. 9A
FIG. 9B

6,014,472

SPECIAL EFFECT DEVICE, IMAGE PROCESSING METHOD, AND SHADOW GENERATING METHOD

TECHNICAL FIELD

The present invention relates to an image processing apparatus, and more particularly, a special effect apparatus for obtaining stereoscopic vision by attaching a shadow to a three-dimensionally image-transformed object video signal.

BACKGROUND ART

First, a conventional special effect apparatus will be described with reference to FIG. 1.

So far, in a field of image processing apparatuses, a special effect apparatus for performing 3-D image transformation for a source video signal supplied from an external apparatus has been realized. In this type of the special effect apparatus, a shadow is attached to an object video signal which has been image-transformed to 3-D position to generate stereoscopic effect. The object video signal is a video signal to be 3-D transformed. In the conventional special effect apparatus, in order to attach a shadow to the object video signal, an operator operates a pointing device such as a 3-D joystick to perform a desired first 3-D transformation processing for a first source video signal which is the basis of the object video signal. As shown in FIG. 1A, the 3-D transformed video signal is represented as an object video signal Vobj, and the object video signal Vobj is displayed on a monitor. Next, the operator operates the pointing device to perform a second 3-D transformation processing for a second source video signal, which is the basis of a shadow video signal, for example, of which color is black. Specifically, the operator performs the 3-D transformation processing for a video signal having the color of shadow so that the 3-D transformed shadow video signal Vshadow looks like the shadow of the object video signal Vobj displayed on the monitor.

However, in such conventional special effect apparatus, since the 3-D transformation processing is respectively performed for the object video signal Vobj and the shadow video signal Vshadow, it is very difficult to produce the shadow video signal Vshadow which looks like a natural shadow as the shadow of the object video signal Vobj. In addition, even the skilled operator repeats trial-and-error to produce the shadow video signal Vshadow which looks like the natural shadow, so that there has been a problem that it takes a long time to produce the shadow video signal.

Further, in such conventional special effect apparatus, as aforementioned above, since the 3-D transformation processing is respectively performed for the object video signal Vobj and the shadow video signal Vshadow, even if the object video signal Vobj shown in FIG. 1A is 3-D transformed to a position of an object video signal Vobj' shown in FIG. 1B, the shadow video signal Vshadow does not move. Therefore, a new natural shadow has to be produced for the object video signal Vobj'. Accordingly, since the shadow video signal has to be produced whenever the object video signal is 3-D transformed, there has been a problem that the operation is very complicated.

DISCLOSURE OF THE INVENTION

The present invention has been made in view of the aforesaid conventional problems, and is intended to provide a special effect apparatus which can attach a suitable shadow to an object video signal without relaying an experience of an operator. Further, the present invention is intended to provide the special effect apparatus which can automatically produce a shadow video signal coupled to the spatial movement of the object video signal.

Further, specifically, the special effect apparatus of the present invention comprises: an object signal producing section for producing a virtual 3-D object video signal by performing a 3-D image transformation for a source video signal and then performing a 2-D object video signal which represents a 3-D image transformation processing by projecting the virtual 3-D object video signal onto a 2-D plane; and a shadow signal producing section for producing a virtual 3-D shadow signal by projecting the 3-D video signal onto a shadow plane which has been set beforehand and then producing a 2-D shadow signal by projecting the virtual 3-D shadow signal onto the screen. Thereby, the shadow video signal corresponding to the 3-D transformed object video signal can be automatically obtained by calculations.

Further, the special effect apparatus of the present invention comprises: an object signal producing section for producing a 2-D object video signal from the source video signal on the basis of a 3-D image transformation matrix for 3-D image-transforming the source video signal onto a virtual space and a perspective transformation calculation for perspectively transforming a video signal, which virtually exists on a 3-D space, onto the screen; a shadow signal producing section for producing a 2-D shadow signal on the basis of the 3-D image transformation matrix for 3-D image-transforming the source video signal onto the virtual space, a perspective transformation matrix for perspectively transforming a video signal, which virtually exists on the 3-D space, onto a shadow plane, and a perspective transformation matrix for perspectively transforming a video signal, which virtually exists on a shadow plane, on the screen; and a control means (CPU) for controlling a video signal producing means so that the 2-D object video signal becomes a video signal which visually represents the 3-D image transformation and for controlling a shadow signal producing means so that the 2-D shadow signal which has been produced by the shadow signal producing means becomes a video signal which represents a shadow of the 2-D object video signal. Thereby a natural shadow can be attached automatically to the 3-D transformed object video signal.

Furthermore, the special effect apparatus of the present invention comprises: a video signal producing section for producing a virtual 3-D video signal by performing the 3-D image transformation for the source video signal; a shadow signal producing section for producing the virtual 3-D shadow signal which exists on the shadow plane by performing the perspective transformation for the 3-D video signal; and a control means (CPU) for controlling the video signal processing section so that the 3-D video signal virtually moves in a 3-D space and controlling the shadow signal producing section so that the shadow signal moves on the shadow plane coupled to the virtual movement of the 3-D video signal. Thereby, the effect that the shadow signal moves on the shadow plane accompanying with the movement of the object video signal on the 3-D space can be obtained.

BRIEF DESCRIPTION OF THE DRAWINGS

FIG. 5 is a drawing showing the relation between an address on a frame memory and an address on a monitor screen.

FIG. 9 is a flow showing a procedure of performing a transformation processing for a point light source and the 3-D object video signal.

BEST MODE FOR CARRYING OUT THE INVENTION (1) General constitution

Figure 1A:
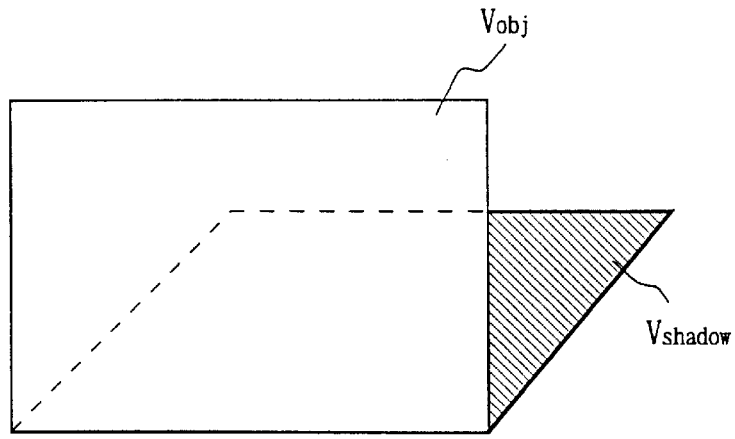
FIG. 1 is a drawing explaining a background technology.
Figure 1B:
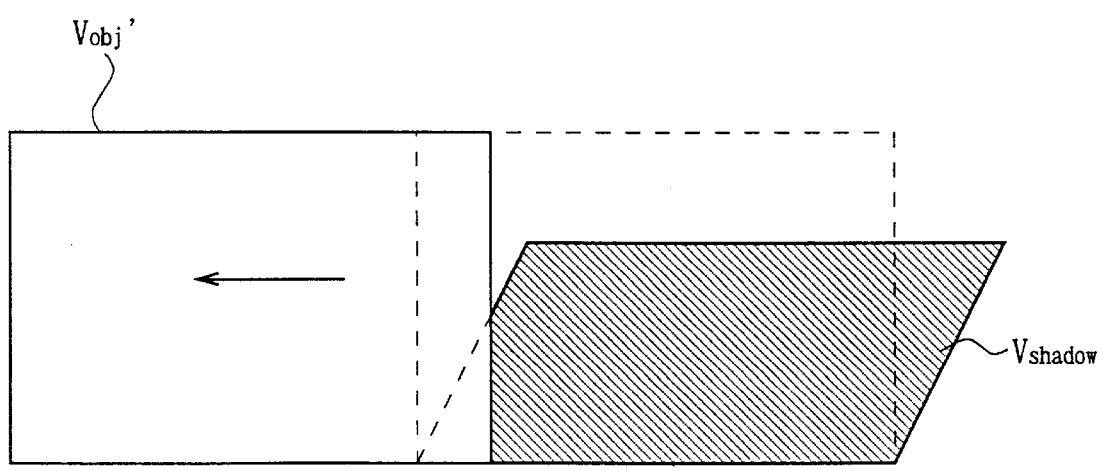
Figure 2:
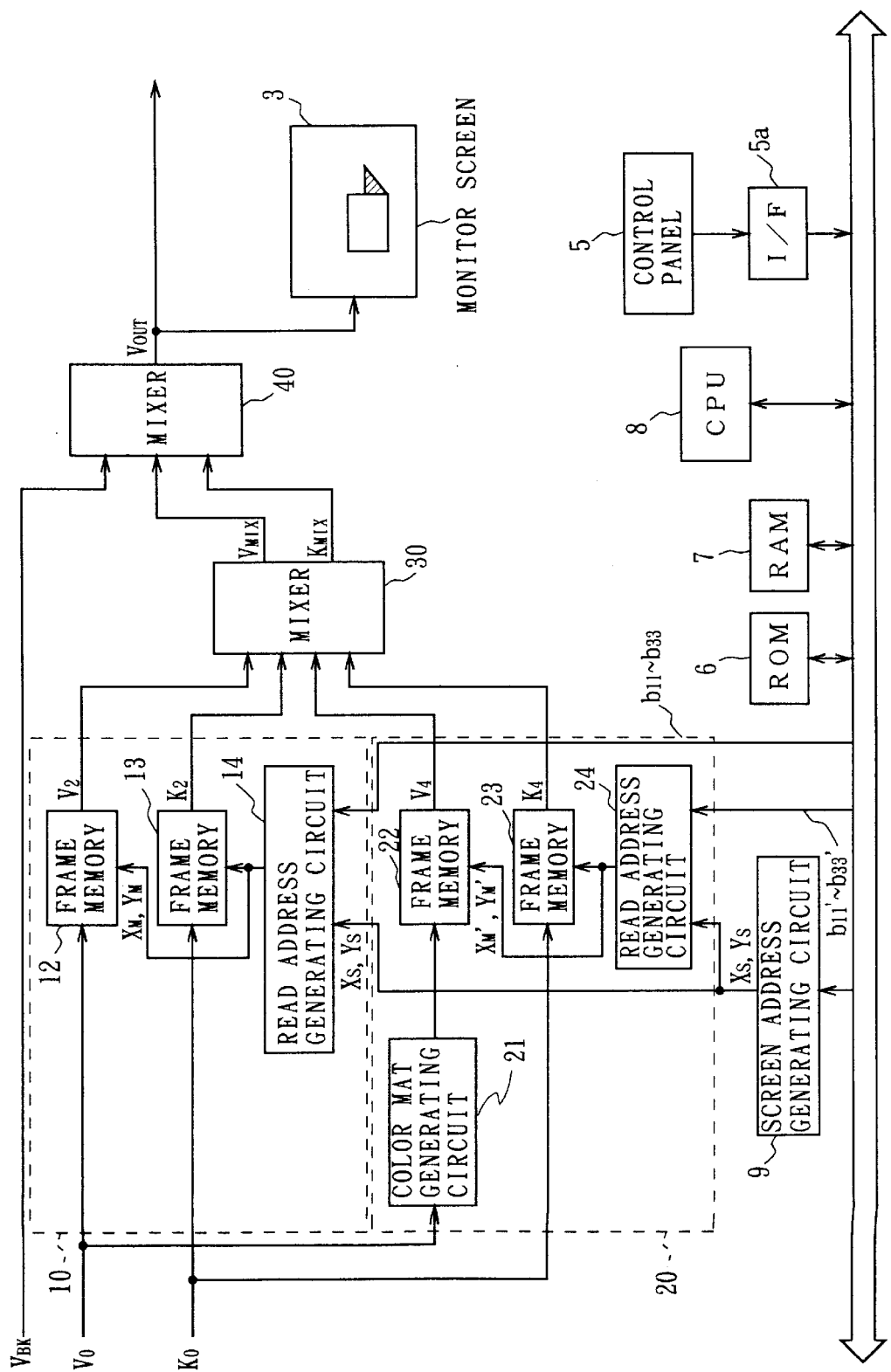
FIG. 2 is a block diagram showing the general constitution of the special effect apparatus of the present invention.

First, a constitution of a special effect apparatus 1 of the present invention will be described with reference to FIG. 2.

A CPU 8 is a processor for controlling all circuits of the special effect apparatus 1. The CPU 8 receives respective parameters, which are obtained by operating a control panel 5 by an operator, through an interface circuit (I/F) 5a and a data bus, and then controls each circuit on the basis of the parameters. The control panel 5 inputs a perspective value $P_z$, rotational angles $(\theta_X, \theta_Y, \theta_Z)$ of $X_S$-axis, $Y_S$-axis, and $Z_S$-axis of a shadow coordinate system, the origin $(x_{SO}, y_{SO}, z_{SO})$ of the shadow coordinate system, the kind of a light source indicating whether a parallel light source or a point light source, a position $(x_L, y_L, z_L)$ of the point light source, a position $(\Gamma, \beta, \alpha)$ of the parallel light source, and parameters "$r_{11}$" to "$r_{33}$", "$l_X$","$l_Y$", "$l_Z$", and "s" concerning a 3-D transformation. The parameters will be described later. In addition, the CPU 8 receives the parameters input from the control panel 5 to reflect them in calculations of a read address at real time. Specifically, the CPU 8 checks the change of the parameters supplied from the control panel 5 for each frame, and calculates parameters ($b_{11}$ to $b_{33}$, $b_{11}'$ to $b_{33}'$, and $b_{11}''$ to $b_{33}''$) for calculating the read address on the basis of the supplied parameters for each frame. Thereby, the parameters can be changed at real time for each frame in accordance with the operation of the operator, and a special effect can be performed for a source video signal at real time in accordance with the changed parameters.

Note that, the special effect apparatus of the present invention can select a desired light source out of a point light source and a parallel light source by inputting the kind of the light source from the control panel 5. Hereinafter, a mode for producing a shadow of an object by the point light source is referred to as a point light source mode, and a mode for producing a shadow of an object by the parallel light source is referred to as a parallel light source mode.

Further, the CPU 8 controls each circuit and calculates the read address, on the basis of a program stored in a ROM (Read Only Memory) 6 which has been provided as a program memory. In addition, in similarly, the CPU 8 controls each circuit and calculates the read address, on the basis of data stored in a RAM (Random Access Memory) 7 which has been provided as a work memory.

An object signal producing section 10 receives a source video signal $V_0$ from an external apparatus, and then performs a 3-D transformation processing for the source video signal $V_0$ to produce a 2-D object video signal $V_2$. In addition, the object signal producing section 10 receives a source key signal $K_0$ for keying the source video signal $V_0$, and then performs the 3-D transformation processing for the source key signal $K_0$ as with the source video signal in order to produce an object key signal $K_2$. Specifically, the object signal producing section 10 has a frame memory 12 for temporally storing the source video signal $V_0$, a frame memory 13 for temporally storing the source key signal $K_0$ for keying the source video signal, and a read address generating circuit 14 for supplying the read address ($X_M$, $Y_M$) calculated corresponding to the 3-D transformation operation to the frame memory 12 and the frame memory 13.

The frame memory 12 is a memory for temporarily storing the supplied source video signal $V_0$. Since sequential write addresses are supplied to the frame memory 12 from a write address generating circuit which is not shown, the supplied source video signal $V_0$ is stored in the frame memory 12 as it is without changing. Further, since the read address ($X_M$,$Y_M$) calculated corresponding to the 3-D transformation operation is supplied from the read address generating circuit 14 to the frame memory 12, the 3-D transformed object video signal $V_2$ is output from the frame memory 12 for each frame. The output object video signal $V_2$ is sent to a mixer 30.

The frame memory 13 is a memory for temporarily storing the source key signal $K_0$ for keying the source video signal $V_0$. Since the same write address as the sequential write address supplied to the frame memory 12 is supplied to the frame memory 13, as with the source video signal $V_0$, the supplied source key signal $K_0$ is stored in the frame memory 13 as it is without varying. In addition, since the same address ($X_M$,$Y_M$) as the read address supplied to the frame memory 12 is supplied to the frame memory 13, the 3-D transformed object key signal $K_2$ is output from the frame memory 13 as with the 3-D transformed object video signal $V_2$. The output object key signal $K_2$ is output to the mixer 30.

The read address generating circuit 14 generates the read address ($X_M$,$Y_M$), which is supplied to the frame memory 12 and the frame memory 13, on the basis of the address ($X_S$,$Y_S$) on a monitor screen 3 which is sequentially supplied from the screen address generating circuit 9 and the parameters $b_{11}$ to $b_{33}$ of an image transformation matrix calculated by the CPU 8. Detailed calculations in the read address generating circuit 14 will be described later.

A shadow signal producing section 20 is a circuit for producing a shadow video signal and a shadow key signal. first, in the case where the point light source mode is selected, the shadow signal producing section 20 receives the source video signal $V_0$ supplied from the external apparatus, and then performs the 3-D transformation processing for the source video signal, which has been mat-processed a shadow color, in order to produce a shadow video signal $V_4$. In addition, the shadow signal producing section 20 receives the source key signal $K_0$ for keying the source video signal, and then performs the 3-D transformation processing for it as with the shadow video signal $V_4$ in order to produce a shadow key $K_4$. In the case where the parallel light source mode is selected, the shadow signal producing section 20 receives the source video signal $V_0$ supplied from the external apparatus, and then performs the 3-D transformation processing for the source video signal, which has been mat-processed to the shadow color, in order to produce a shadow video signal $V_6$. In addition, the shadow signal producing section 20 receives the source key signal $K_0$ for keying the source video signal, and then performs the 3-D transformation processing for it as with the shadow video signal $V_6$ in order to produce a shadow key signal $K_6$. Specifically, the shadow signal producing section 20 is composed of the similar circuit constitution with the object signal producing section 10, and has a color mat generating circuit 21 for mat-processing the source video signal $V_0$, a frame memory 22 for temporarily storing the mat processed source video signal, a frame memory 23 for temporarily storing the source key signal $K_0$, and a read address generating circuit 24 for supplying the calculated read address to the frame memory 22 and the frame memory 23.

The color mat generating circuit 21 is a circuit which performs the mat processing for the source video signal $V_0$ so that the color of the source video signal $V_0$ looks like the color of shadow. For the most simple example, the levels of the chroma and the luminance of the source video signal $V_0$ are reduced, thereby the color of the source video signal closes to the color of shadow (black).

The frame memory 22 is a memory for temporarily storing the mat-processed source video signal. Since the sequential write addresses are supplied to the frame memory 22 from the write address generating circuit not shown, the mat-processed source video signal is stored in the frame memory 22 as it is without being image-transformed. At the point light mode, since a read address $(X_M',Y_M')$ calculated based on the 3-D transformation operation and the point light source is supplied from the read address generating circuit 24 to the frame memory 22, the 3-D transformed shadow video signal $V_4$ is output from the frame memory 22. At the parallel light source mode, since a read address $(X_M'',Y_M'')$ calculated based on the 3-D transformation operation and the parallel light source is supplied from the read address generating circuit 24 to the frame memory 22, the 3-D transformed shadow video signal $V_6$ is output from the frame memory 22.

The frame memory 23 is a memory for temporarily storing the source key signal $K_0$ for keying the source video signal $V_0$. Since the same address as the sequential write address supplied to the frame memory 22 is supplied to the frame memory 23, the supplied source key signal $K_0$ is stored in the frame memory 23 as it is without being image-transformed. At the point light source mode, since the same address $(X_M',Y_M')$ as the read address supplied to the frame memory 22 is supplied to the frame memory 23, the 3-D transformed shadow key signal $K_4$ is output from the frame memory 23 as with the 3-D transformed shadow video signal $V_4$. At the parallel light source mode, since the same address $(X_M'',Y_M'')$ as the read address supplied to the frame memory 22 is supplied to the frame memory 23, the 3-D transformed shadow key signal $K_6$ is output from the frame memory 23 as with the shadow video signal $V_6$.

The read address generating circuit 24 is a circuit for generating the read address which is supplied to the frame memory 22 and the frame memory 23. At the point light source mode, the read address generating circuit 24 generates the read address $(X_M',Y_M')$ on the basis of the address $(X_S,Y_S)$, which is sequentially supplied from a screen address generating circuit 9, on the monitor screen 3 and the parameters $b_{11}'$ to $b_{33}'$ of the image transformation matrix calculated by the CPU 8. At the parallel light source mode, the read address generating circuit 24 generates the read address $(X_M'',Y_M'')$ on the basis of the address $(X_S,Y_S)$, which is sequentially supplied from the screen address generating circuit 9, on the monitor screen and the parameters $b_{11}''$ to $b_{33}''$ of the image transformation matrix calculated by the CPU 8. Note that, detailed calculations in the read address generating circuit 24 will be described later.

The screen address generating circuit 9 is a circuit for addressing the whole screen of the monitor screen 3 in the order of corresponding to the order of a raster scan. Specifically, a screen address $(X_S,Y_S)$ is produced based on a horizontal synchronization signal and a vertical synchronization signal generated in the interior.

The first mixer 30 is a circuit for mixing signals supplied from the object signal producing section 10 and the shadow signal producing section 20. At the point light source mode, the first mixer 30 receives the object video signal $V_2$ and the object key signal $K_2$ output from the object signal producing section 10 and receives the shadow video signal $V_4$ and the shadow key signal $K_4$ output from the shadow signal producing section 20, in order to produce a mixed video signal $V_{MIX}'$ obtained by mixing the object video signal $V_2$ and the shadow video signal $V_4$, and a mixed key signal $K_{MIX}'$ obtained by mixing the object key signal $K_2$ and the shadow key signal $K_4$. Specifically, the mixed video signal $V_{MIX}'$ and the mixed key signal $K_{MIX}'$ are represented as the following equations.

$$V_{MIX}'=K_2V_2+(1-K_2)K_4V_4$$

$$K_{MIX}'=1-(1-K_2)(1-K_4) \qquad (a)$$

Further, at the parallel light source mode, the first mixer 30 receives the object video signal $V_2$ and the object key signal $K_2$ output from the object signal producing section 10 and receives the shadow video signal $V_6$ and the shadow key signal $K_6$ output from the shadow signal producing section 20, in order to produce a mixed video signal $V_{MIX}''$ obtained by mixing the object video signal $V_2$ and the shadow video signal $V_6$, and a mixed key signal $K_{MIX}''$ obtained by mixing the object key signal $K_2$ and the shadow key signal $K_6$. Specifically, the mixed video signal $V_{MIX}''$ and the mixed key signal $K_{MIX}''$ are represented as the following equations.

$$V_{MIX}''=K_2V_2+(1-K_2)K_6V_6$$

$$K_{MIX}''=1-(1-K_2)(1-K_6) \qquad (b)$$

A second mixer 40 is a circuit for mixing the mixed video signal output from the first mixer 30 and a background video signal $V_{BK}$ supplied from the external apparatus. At the point light source mode, the second mixer 40 receives the mixed video signal $V_{MIX}'$ and the mixed key signal $K_{MIX}'$ output from the first mixer 30 and receives the background video signal $V_{BK}$ supplied from the external apparatus, and then mixes the mixed video signal $V_{MIX}'$ and the background video signal $V_{BK}$ on the basis of the mixed key signal $K_{MIX}'$ in order to produce an output video signal $V_{OUT}'$. Specifically, the output video signal $V_{OUT}'$ is represented as the following equation.

$$V_{OUT}'=K_{MIX}'V_{MIX}'+(1-K_{MIX}')V_{BK} \qquad (c)$$

At the point light source mode, the second mixer 40 receives the mixed video signal $V_{MIX}''$ and the mixed key signal $K_{MIX}''$ output from the first mixer 30 and receives the background video signal $V_{BK}$ supplied from the external apparatus, and then mixes the mixed video signal $V_{MIX}''$ and the background video signal $V_{BK}$ on the basis of the mixed key signal $K_{MIX}''$ in order to produce an output video signal $V_{OUT}''$. Specifically, the output video signal $V_{OUT}''$ is represented as the following equation.

$$V_{OUT}''=K_{MIX}''V_{MIX}''+(1-K_{MIX}'')V_{BK} \qquad (d)$$

The produced output video signal $V_{OUT}'$ or $V_{OUT}''$ is output to an external apparatus and is displayed on the monitor screen 3.

(2) Definition of world coordinate system

Figure 3:
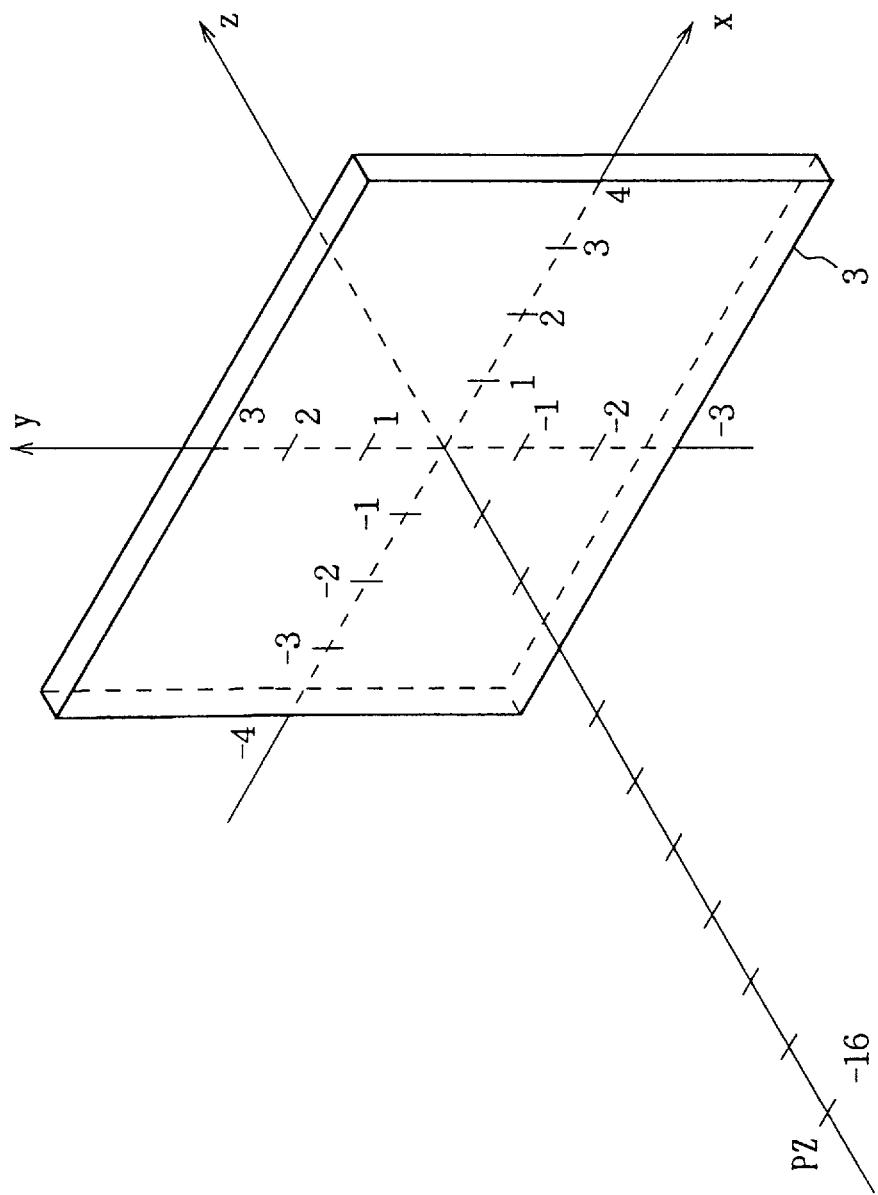
FIG. 3 is a drawing explaining a world coordinate system defined in the special effect apparatus of the present invention.

First, a world coordinate system used in the explanation of the present invention will be described with reference to FIG. 3. The world coordinate system is a 3-D rectangular coordinate system consisting of an X-axis, a Y-axis, and a Z-axis. That is, as shown in FIG. 3, assuming that the screen plane 3 exists on an X-Y plane which is defined by the X-axis and the Y-axis which is orthogonal to the X-axis, it is defined that the X-axis is a horizontal (right and left) direction of the screen plane 3 and the Y-axis is a vertical (up and down) direction of the screen plane 3.

Further, a depth direction of the screen plane 3 is defined as a plus direction of the Z-axis which is orthogonal to the X-Y plane, and this side of the screen plane 3, that is, the side of which a view point PZ for viewing the screen plane exists is defined as a minus direction of the Z-axis.

Furthermore, it is defined that the center of the screen plane 3 is the same as the origin of the world coordinate system consisting of the X-axis, the Y-axis, and the Z-axis.

On the X-axis, virtual coordinate values are sequentially set from the inside (the origin) toward the outside in the right and left directions in the screen area. On the X-axis in the screen area, the virtual coordinate values between "−4" to "+4" are set from the left toward the right, viewing the screen plane 3 from the view point PZ.

Further, on the Y-axis, virtual coordinate values are sequentially set from the inside (the origin) toward the outside in the up and down directions in the screen area. On the Y-axis in the screen area, the virtual coordinate values between "−3" to "+3" are set from the bottom toward the top, viewing the screen plane 3 from the view point PZ.

Furthermore, the view point PZ of the operator is virtually set to the position of the coordinate value "−16" on the Z-axis.

(3) Explanation of transformation processing for producing the object video signal First, a transformation processing for producing the object video signal $V_2$ from the source video signal $V_0$ will be described with reference to FIGS. 4A and 4B.

First, the source video signal $V_0$ being 2-D data is stored in the frame memory 12 as it is without being image-transformed. Therefore, as shown in FIGS. 4A and 4B, the source video signal $V_0$ exists on the X-Y plane of the world coordinate system, so that the image of the source video signal $V_0$ is displayed on the screen plane 3 existing on the X-Y plane.

Figures 4A, 4B:
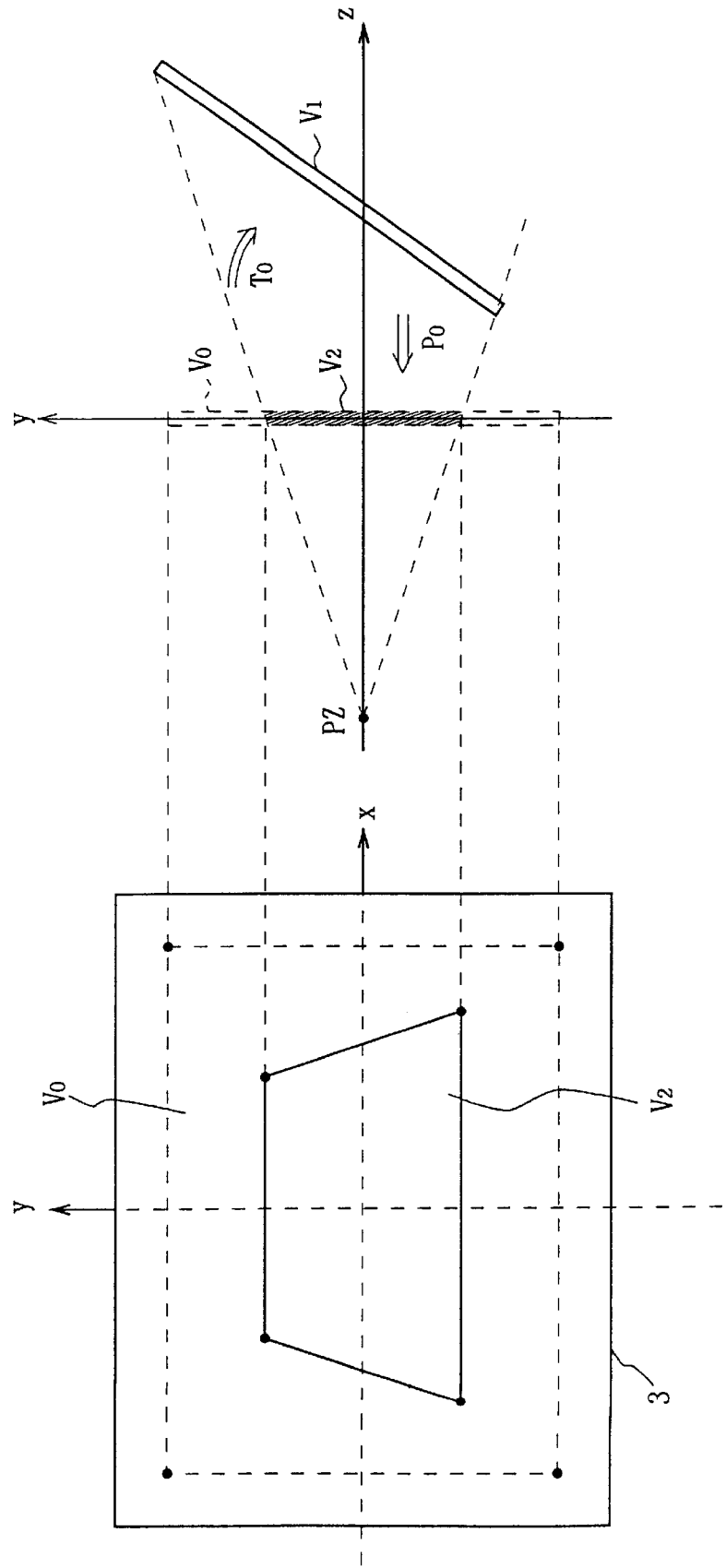
FIG. 4 is a drawing explaining a transformation processing for obtaining an object video signal.

Note that, FIG. 4A, in a space which is represented by the 3-D coordinates of the world coordinate system, shows the state that the X-Y plane is viewed from the view point PZ on the Z-axis. In other words, FIG. 4A shows a picture which is displayed on the screen plane 3. Further, FIG. 4B, in the space which is represented by the 3-D coordinates of the world coordinate system, shows the state that a X-Z plane is viewed from a view point of a plus side on the Y-axis. Therefore, the source video $V_0$ which exists on the X-Y plane overlaps with the screen plane 3.

The operator operates the control panel, thereby the 3-D image transformation processing is performed for the source video signal $V_0$ in the world coordinate space. That is, the operation of the operator performs a 3-D transformation matrix $T_0$ comprising parameters, which is set for each frame, for each pixel of the source video signal $V_0$, thereby the source video signal $V_0$ is transformed to a 3-D spatial position. In FIG. 4B, the 3-D image-transformed video signal is represented as a 3-D object video signal $V_1$. The 3-D transformation shown in FIGS. 4A and 4B is an example of the case where the source video signal $V_0$ turns by about 45 degree with the X-axis being as a pivot and further translates in the plus direction of the Z-axis.

The 3-D transformation matrix $T_0$ used for the 3-D transformation is represented as the following equation.

$$T_0 = \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix} \qquad (1)$$

The transformation parameters "$r_{11}$" to "$r_{33}$" used for the 3-D transformation matrix $T_0$ are parameters including constituents for turning the source video signal $V_0$ around the X-axis, the Y-axis, and the Z-axis, for respectively magnifying/reducing the scale of the source video signal in the X-axis, the Y-axis, and the Z-axis directions, and for respectively skewing the source video signal in the X-axis, the Y-axis, and the Z-axis directions. The parameters "$l_x$", "$l_y$" and "$l_z$" are parameters including constituents for respectively translating the source video signal in the X-axis, the Y-axis, and the Z-axis directions. The parameter "$s$" is a parameter including constituent for uniformly magnifying/reducing the whole source video signal in the respective 3-D axis directions.

Note that, the transformation matrix $T_0$ represents the coordinate system such as the rotational transformation and the coordinate systems of the translation transformation and the magnification/reduction transformation in one coordinate system, so that the matrix has 4×4 matrix and generally is referred to as a homogeneous coordinate.

After the source video signal $V_0$ which exists on the X-Y plane is transformed into the 3-D position, represented by the 3-D object video signal $V_1$, by the 3-D transformation matrix $T_0$, the process proceeds to a next perspective transformation processing.

The perspective transformation processing is a transformation processing of seeing through the 3-D object video signal $V_1$ on the X-Y plane by a perspective transformation matrix $P_0$. In other words, the perspective transformation processing is a transformation for obtaining an image of a video signal which is seen through on the X-Y plane when the 3-D object video signal $V_1$ is viewed from the virtual view point PZ on the Z-axis. In FIG. 4B, the video signal which has been seen through on the X-Y plane is represented as a 2-D object video signal $V_2$. In the case of FIG. 4B, the object video signal $V_2$ on the X-Y plane which has been seen through on the screen plane 3 on the X-Y plane is such a video image that the 3-D object video signal $V_1$ exists on the depth side of the screen plane 3 with viewing it from the virtual view point PZ.

The perspective transformation matrix $P_0$ is represented as the following equation.

$$P_O = \begin{bmatrix} 1 & 0 & 0 & 0 \\ 0 & 1 & 0 & 0 \\ 0 & 0 & 0 & P_z \\ 0 & 0 & 0 & 1 \end{bmatrix} \quad (2)$$

The parameter "$P_z$" of the perspective transformation matrix $P_0$ is a perspective value for adopting a perspective when the 3-D transformation video signal $V_2$ is seen through on the X-Y plane. That is, in the case of FIG. 4B, the 3-D object video signal $V_1$ in the 3-D space leans at an angle of 45 degree with respect to the X-Y plane. In the case of viewing it from the virtual view point PZ, a far portion from the virtual view point PZ is viewed small, a near portion is viewed large. Therefore, by using the parameter "$P_z$" indicating the perspective, the 2-D object video signal $V_2$ which is seen through on the X-Y plane is what the 3-D object video signal $V_1$ which exists in the 3-D space is transformed according to the distance from the virtual view point PZ.

The position to which the 3-D object video signal $V_1$ is perspectively transformed on the screen plane 3 changes according to the distance between the virtual view point PZ and the screen plane 3 and the distance between the virtual view point PZ and the 3-D object video signal $V_1$. The perspective transformation can be carried out according to the position of the virtual view point PZ by setting the perspective value $P_z$ according to the position of the virtual view point PZ by the operator. Normally, the position of the view point PZ is a coordinate value "−16" on Z-axis, and the perspective value $P_z$ is set so that "1/16" is a standard value.

As described above, the transformation processing for producing the 2-D object video signal $V_2$ from the source video signal $V_0$ comprises: a spatial image transformation step for obtaining the 3-D object video signal $V_1$ from the source video signal $V_0$ by the 3-D transformation matrix $T_0$; and a perspective transformation step for transforming the 3-D object video signal $V_1$, obtained by the spatial image transformation step, into the 2-D object video signal $V_2$ by the perspective transformation matrix $P_0$. Therefore, the transformation matrix $T_{obj}$ for obtaining the 2-D object video signal $V_2$ from the source video signal $V_0$ is represented as the following multiplication between the 3-D transformation matrix $T_0$ and the perspective transformation matrix $P_0$.

$$T_{obj} = T_0 \cdot P_0 \quad (3)$$

$$= \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix} \begin{bmatrix} 1 & 0 & 0 & 0 \\ 0 & 1 & 0 & 0 \\ 0 & 0 & 0 & P_z \\ 0 & 0 & 0 & 1 \end{bmatrix}$$

-continued $$= \begin{bmatrix} r_{11} & r_{12} & r_{13} & r_{13}P_z \\ r_{21} & r_{22} & r_{23} & r_{23}P_z \\ r_{31} & r_{32} & r_{33} & r_{33}P_z \\ l_x & l_y & l_z & l_zP_z + s \end{bmatrix}$$

Here, an image processing apparatus using the special effect apparatus of the present invention once writes the 2-D source video signal $V_0$ supplied form the external apparatus, and supplies the 2-D read address $(X_S, Y_S)$ calculated to the frame memory 12. Thereby, the operator can perform the desired spatial image transformation (3-D image transformation) for the video signal read from the frame memory 12. Therefore, both the source video signal $V_0$ which is stored in the frame memory 12 and the object video signal $V_2$ which is read from the frame memory 12 are 2-D data. That is, the data of the Z-axis direction in the 3-D space is not essentially used in the calculation of the 2-D read address $(X_S, Y_S)$.

Therefore, the parameters in the third line and the third row for calculating the constituent of the Z-axis direction in the equation (3) are not necessary for calculating the read address for the frame memory 12.

Therefore, a 3-D transformation matrix having parameters necessary for the calculation of the actual 2-D read address is referred to as $T_{33}$, the matrix $T_{33}$ is represented as the following equation in which the parameters in the third line and the third row are excluded from the equation (3).

$$T_{33} = \begin{bmatrix} r_{11} & r_{12} & r_{13}P_z \\ r_{21} & r_{22} & r_{23}P_z \\ l_x & l_y & l_zP_z + s \end{bmatrix} \quad (4)$$

Here, the relation between position vectors on the frame memory 12 and on the monitor screen 3 will be described.

In FIG. 5A, it is assumed that a 2-D address on the frame memory 12 is $(X_M, Y_M)$, a position vector on the frame memory 12 is $[X_M\ Y_M]$, an address on the monitor screen 3 is $(X_S, Y_S)$, and a position vector on the monitor screen 3 is $[X_S\ Y_S]$. The 2-D position vector $[X_M\ Y_M]$ on the frame memory 12 can be represented as a vector $[x_m\ y_m\ H_0]$ in the homogeneous coordinate. Further, the position vector $[X_s\ y_s]$ on the monitor screen 3 can be represented as a vector $[x_s\ y_s\ 1]$ in the homogeneous coordinate.

Note that, the parameter "$H_0$" of the homogeneous coordinate is a parameter representing the magnification/reduction rate of the size of a vector.

The 3-D transformation matrix $T_{33}$ is performed for the position vector $[x_m\ y_m\ H_0]$ on the frame memory 12, thereby the position vector $[x_m\ y_m\ H_0]$ on the frame memory 12 is transformed into a position vector $[x_s\ y_s\ 1]$ on the monitor screen 3. Therefore, the relation between the position vector $[x_m\ y_m\ H_0]$ on the frame memory 12 and the position vector $[x_s\ y_s\ 1]$ on the monitor screen 3 can be represented as the following equation.

$$[x_s\ y_s\ 1] = [x_m\ y_m\ H_0] \cdot T_{33} \quad (5)$$

Note that, the relation between the parameter "$H_0$" of the homogeneous coordinate, used in the position vector $[x_m\ y_m\ H_0]$ on the frame memory 12, and the parameter "1" of the homogeneous coordinate, used in the position vector $[x_s\ y_s\ 1]$ on the monitor screen 3, represents that, by the 3-D transformation matrix $T_{33}$, the 2-D position vector $[x_m\ y_m]$ on the frame memory 12 is transformed into the 2-D position vector $[x_s, y_s]$ on the monitor screen 3 and the magnification/ reduction rate "$H_0$" of the 2-D position vector $[x_m\ y_m]$ on the frame memory 12 is transformed into the magnification/reduction rate "1" of the position vector $[x_s\ y_s]$ of the homogeneous coordinate on the monitor screen 3.

As described above, the equation (5) is a relation equation for obtaining a point on the monitor screen 3 corresponding to a point on the frame memory 12 by the matrix $T_{33}$. Here, in the image processing apparatus using the special effect apparatus, the source video signal before transforming is stored in the frame memory 12, and the point on the frame memory 12, obtained by the transformation matrix $T_{33}$, corresponding to the point of the monitor screen 3 is designated by the read address. Thereby, the spatial image transformation is performed for the source video signal. That is, the image transformation is performed not when a signal is written in the frame memory 12 but the signal is read from the frame memory 12.

In this type of the image processing apparatus, such the calculation of the equation (5) that the point on the monitor screen 3 corresponding the point on the frame memory 12 is obtained is not carried out, but it is necessary that the point on the frame memory 12 corresponding to the point on the monitor screen 3 is obtained. Therefore, by transforming the equation (5) and using the relation represented as the following equation, the point on the frame memory 12 corresponding to the point on the monitor screen 3 can be obtained.

$$[x_m\ y_m\ H_0] = [x_s\ i_s\ 1] \cdot T_{33}^{-1} \quad (6)$$

Therefore, according to the equation (6), if the position vector $[x_s\ y_s\ 1]$ on the monitor screen 3 is designated, the position vector $[x_m\ y_m\ H_0]$ on the frame memory FM is calculated by the transformation matrix $T_{33}^{-1}$. Note that, the transformation matrix $T_{33}^{-1}$ is an inverse matrix of the transformation matrix $T_{33}$.

Next, in order to obtain the 2-D position vector $[X_M\ Y_M]$ on the frame memory FM, the transformation matrix $T_{33}$ and the inverse matrix $T_{33}^{-1}$ are defined as follows. That is, each constituent of the transformation matrix $T_{33}$ is defined as follows.

$$T_{33} = \begin{bmatrix} r_{11} & r_{12} & r_{13}P_z \\ r_{21} & r_{22} & r_{23}P_z \\ l_x & l_y & l_zP_z+s \end{bmatrix} \quad (7)$$

$$= \begin{bmatrix} a_{11} & a_{12} & a_{13} \\ a_{21} & a_{22} & a_{23} \\ a_{31} & a_{32} & a_{33} \end{bmatrix}$$

The parameters of the inverse matrix $T_{33}^{-1}$ are defined as the following equation.

$$T_{33}^{-1} = \begin{bmatrix} a_{11} & a_{12} & a_{13} \\ a_{21} & a_{22} & a_{23} \\ a_{31} & a_{32} & a_{33} \end{bmatrix}^{-1} \quad (8)$$

$$= \begin{bmatrix} b_{11} & b_{12} & b_{13} \\ b_{21} & b_{22} & b_{23} \\ b_{31} & b_{32} & b_{33} \end{bmatrix}$$

wherein $$b_{ij} = \frac{a_{ji}}{\det(T_{33})}$$

By substituting the equation (8) for the equation (6), the following equation is obtained.

$$[x_m\ y_m\ H_0] = [x_s\ y_s\ 1] \begin{bmatrix} b_{11} & b_{12} & b_{13} \\ b_{21} & b_{22} & b_{23} \\ b_{31} & b_{32} & b_{33} \end{bmatrix} = \quad (9)$$

$$[b_{11}x_s + b_{21}y_s + b_{31} \quad b_{12}x_s + b_{22}y_s + b_{32} \quad b_{13}x_s + b_{23}y_s + b_{33}]$$

Thereby, the following relation equation can be obtained.

$$x_m = b_{11}x_s + b_{21}y_s + b_{31}$$

$$y_m = b_{12}x_s + b_{22}y_s + b_{32} \quad (10)$$

$$H_0 = b_{13}x_s + b_{23}y_s + b_{33}$$

Here, the case where the position vector $[x_m\ y_m\ H_0]$ of the homogeneous coordinate on the frame memory 12 is transformed into the 2-D position vector $[X_M\ Y_M]$ on the frame memory 12 will be described.

Since the parameter "$H_0$" used when the 2-D position vector $[X_M\ Y_M]$ is represented in the homogeneous coordinate is a parameter representing the magnification/reduction rate of the position vector $[x_m\ y_m]$ of the homogeneous coordinate, the parameters "$x_m$" and "$y_m$" indicating the direction of the position vector of the homogeneous coordinate may be normalized with the parameter "$H_0$" representing the magnification/reduction rate of the position vector of the homogeneous coordinate, in order to transform the position vector of the homogeneous coordinate into the 2-D position vector. Therefore, the respective parameters "$X_M$" and "$Y_M$" of the 2-D position vector on the monitor screen 3 can be represented as the following equations.

$$X_M = \frac{x_m}{H_0} \quad (11)$$

$$Y_M = \frac{y_m}{H_0}$$

In the case where the vector $[x_s\ y_s\ 1]$ of the homogeneous coordinate on the monitor screen 3 is transformed into the 2-D position vector $[X_S\ Y_S]$, in the similar way, the parameters "$x_s$" and "$y_s$" indicating the direction of the position vector of the homogeneous coordinate may be normalized with the parameter "1" indicating the magnification/reduction rate of the position vector of the homogeneous coordinate. Therefore, the respective parameters "$X_S$" and "$Y_S$" of the 2-D position vector on the monitor screen 3 can be represented as the following equations.

$$X_S = x_s$$

$$Y_S = y_s \quad (12)$$

The 2-D read address $(X_M, Y_M)$ which is supplied to the frame memory 12 can be obtained from the equation (10) as the following equations.

$$X_M = \frac{x_m}{H_0} \qquad (13)$$

$$= \frac{b_{11}x_s + b_{21}y_s + b_{31}}{b_{13}x_s + b_{23}y_s + b_{33}}$$

$$= \frac{b_{11}X_S + b_{21}Y_S + b_{31}}{b_{13}X_S + b_{23}Y_S + b_{33}}$$

$$Y_M = \frac{y_m}{H_0} \qquad (14)$$

$$= \frac{b_{12}x_s + b_{22}y_s + b_{32}}{b_{13}x_s + b_{23}y_s + b_{33}}$$

$$= \frac{b_{12}X_S + b_{22}Y_S + b_{32}}{b_{13}X_S + b_{23}Y_S + b_{33}}$$

Next, the respective parameters "$b_{11}$" to "$b_{33}$" of $T_{33}^{-1}$ will be obtained.

$$b_{11} = \frac{-a_{32}a_{23} + a_{22}a_{33}}{W_1} \qquad (15)$$

$$b_{12} = \frac{a_{32}a_{13} - a_{12}a_{33}}{W_1} \qquad (16)$$

$$b_{13} = \frac{-a_{22}a_{13} + a_{12}a_{23}}{W_1} \qquad (17)$$

$$b_{21} = \frac{a_{31}a_{23} - a_{21}a_{33}}{W_1} \qquad (18)$$

$$b_{22} = \frac{-a_{31}a_{13} + a_{11}a_{33}}{W_1} \qquad (19)$$

$$b_{23} = \frac{a_{21}a_{13} - a_{11}a_{23}}{W_1} \qquad (20)$$

$$b_{31} = \frac{-a_{22}a_{31} + a_{21}a_{32}}{W_1} \qquad (21)$$

$$b_{32} = \frac{a_{12}a_{31} - a_{11}a_{32}}{W_1} \qquad (22)$$

$$b_{33} = \frac{-a_{12}a_{21} + a_{11}a_{22}}{W_1} \qquad (23)$$

wherein $$W_1 = -a_{22}a_{31}a_{13} + a_{21}a_{32}a_{13} + a_{12}a_{31}a_{23} - a_{11}a_{32}a_{23} - a_{12}a_{21}a_{33} + a_{11}a_{22}a_{33} \qquad (24)$$

Here, the values "$a_{11}$" to "$a_{33}$" are obtained from the equation (7).

$$a_{11}=r_{11},\ a_{12}=r_{12},\ a_{13}=r_{13}P_z \qquad (25)$$

$$a_{21}=r_{21},\ a_{22}=r_{22},\ a_{23}=r_{23}P_z \qquad (26)$$

$$a_{31}=l_x,\ a_{32}=l_y,\ a_{33}=l_zP_z+s \qquad (27)$$

So, the following equations can be obtained by substituting these values for the equations (15) to (24).

$$b_{11} = \frac{-l_y r_{23}P_z + r_{22}(l_z P_z + s)}{W_1} \qquad (28)$$

$$b_{12} = \frac{l_y r_{13}P_z + r_{12}(l_z P_z + s)}{W_1} \qquad (29)$$

$$b_{13} = \frac{-r_{22}r_{13}P_z + r_{12}r_{23}P_z}{W_1} \qquad (30)$$

$$b_{21} = \frac{l_x r_{23}P_z - r_{21}(l_z P_z + s)}{W_1} \qquad (31)$$

$$b_{22} = \frac{-l_x r_{13}P_z + r_{11}(l_z P_z + s)}{W_1} \qquad (32)$$

$$b_{23} = \frac{r_{21}r_{13}P_z - r_{11}r_{23}P_z}{W_1} \qquad (33)$$

$$b_{31} = \frac{-r_{22}l_x + r_{21}l_y}{W_1} \qquad (34)$$

$$b_{32} = \frac{r_{12}l_x - r_{11}l_y}{W_1} \qquad (35)$$

$$b_{33} = \frac{-r_{12}r_{21} + r_{11}r_{22}}{W_1} \qquad (36)$$

$$W_1 = -r_{22}l_x r_{13}P_z + r_{21}l_y r_{13}P_z + r_{12}l_x r_{23}P_z - r_{11}l_y r_{23}P_z - r_{12}r_{21}(l_z P_z + s) + r_{11}r_{22}(l_z P_z + s) \qquad (37)$$

By substituting the values of the equations (28) to (37) for the equations (13) and (14), the read address $(X_M, Y_M)$ which is supplied to the frame memory 12 is obtained as the following equations.

$$X_M = \frac{1}{H_0}[\{-l_x r_{23}P_z + r_{22}(l_z P_z + s)\}X_S + \qquad (38)$$
$$\{l_y r_{13}P_z + r_{12}(l_z P_z + s)\}Y_S + (-r_{22}r_{13}P_z + r_{12}r_{23}P_z)]$$

$$Y_M = \frac{1}{H_0} = [\{l_x r_{23}P_z - r_{21}(l_z P_z + s)\}X_S + \qquad (39)$$
$$\{-l_x + r_{11}(l_z P_z + s)\}Y_S + \{r_{21}r_{13}P_z - r_{11}r_{23}P_z\}]$$

Wherein "$H_0$" is represented as the following equation.

$$H_0 = (-r_{22}l_x + r_{21}l_y)X_S + (r_{12}l_x - r_{11}l_y)Y_S + (-r_{12}r_{21} + r_{11}r_{22}) \qquad (40)$$

Therefore, the read address $(X_M, Y_M)$ which is supplied to the frame memory 12 can be represented by using the respective parameters ("$r_{11}$" to "$r_{33}$", "$l_x$", "$l_y$", "$l_z$", and "s") of the 3-D transformation matrix $T_0$, decided by the spatial image transformation apparatus desired by the operator, and the perspective value $P_z$, which is a parameter set beforehand.

Therefore, if the screen address $(X_S, Y_S)$ for addressing so as to correspond to the order of the raster scan of the monitor screen 3 is supplied to the equations (6) to (40), the read address $(X_M, Y_M)$ on the frame memory 12 corresponding to the supplied screen address can be calculated in order.

(4) Explanation of the shadow coordinate system

Figure 6:
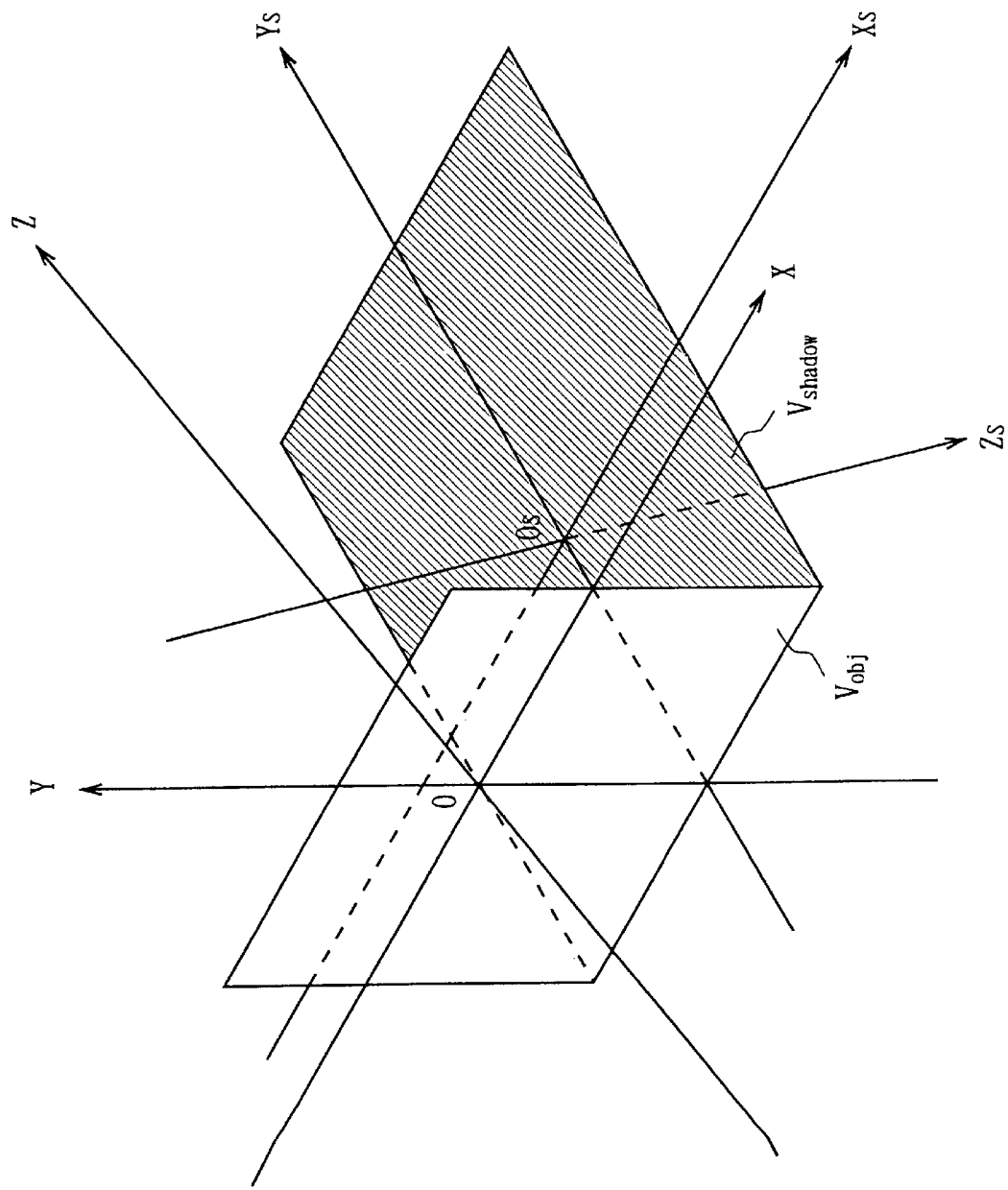
FIG. 6 is a drawing explaining a shadow coordinate system.

Next, the shadow coordinate system will be described with reference to FIG. 6. The shadow coordinate system is defined by a 3-D rectangular coordinate system comprising of an $X_S$-axis, a $Y_S$-axis, a $Z_S$-axis as with the world coordinate system. As shown in FIG. 6, a shadow which is attached to an object video signal $V_{obj}$ is defined as a shadow video signal $V_{shadow}$, and a plane on which the shadow video signal $V_{shadow}$ is projected is defined as an X-Y plane of the shadow coordinate system, which is referred to as a shadow plane. A direction in which a light source for projecting the shadow of the object video signal $V_{obj}$ exists is defined as a minus direction of the Z-axis in the shadow coordinate system. As described below, the special effect apparatus of the present invention has the point light source mode for producing the shadow by using the point light source as the light source and the parallel light source mode for producing the shadow by using the parallel light source as the light source. The operator can set these modes freely. In addition, the operator can freely set the respective angles of the $X_S$-axis, the $Y_S$-axis, and the $Z_S$-axis of the shadow coordinate system corresponding to the X-axis, the Y-axis, and the Z-axis of the world coordinate system.

(5) Explanation of a transformation processing for producing a shadow video signal at the point light source mode.

First, at the point light source mode, a transformation processing for transforming a source video signal to obtain the shadow video signal $V_4$ will be described with reference to FIGS. 7A and 7B. Note that, as with FIGS. 4A and 4B, FIG. 7A is a drawing of viewing the X-Y plane of the world coordinate system from the view point PZ set on the Z-axis of the world coordinate system, and FIG. 7B is a drawing of viewing the Y-Z plane of the world coordinate system from a plus position of X-axis of the world coordinate system.

First, as described using FIGS. 4A and 4B, the 3-D object video signal $V_1$ transformed into a 3-D spatial position by the 3-D transformation matrix $T_0$ is perspectively transformed on the $X_S$-$Y_S$ plane of the shadow coordinate by a perspective transformation matrix $P_{SPOT}$ according to the point light source. This means that, in the case where a point light source 60 is assumed as a view point, when the 3-D object video signal $V_1$ is viewed from the point light source 60, a video signal which is perspectively transformed on the $X_S$-$Y_S$ plane of the shadow coordinate system is obtained. In FIG. 7B, the video signal perspectively transformed on the $X_S$-$Y_S$ plane of the shadow coordinate system is referred to as a 3-D shadow video signal $V_3$. A detailed explanation of the perspective transformation matrix $P_{SPOT}$ according to the point light source will be described later.

Next, the 3-D shadow video signal $V_3$ is perspectively transformed by the aforementioned perspective transformation matrix $P_0$ so as to be perspectively transformed on the X-Y plane of the world coordinate system. This means that, when the 3-D shadow video signal $V_3$ is viewed from the virtual view point PZ on the Z-axis, a video signal which is seen through on the X-Y plane of the world coordinate system is obtained. In FIG. 7B, the video signal seen through on the X-Y plane of the world coordinate system is referred to as a 2-D shadow video signal $V_4$.

Figure 7:
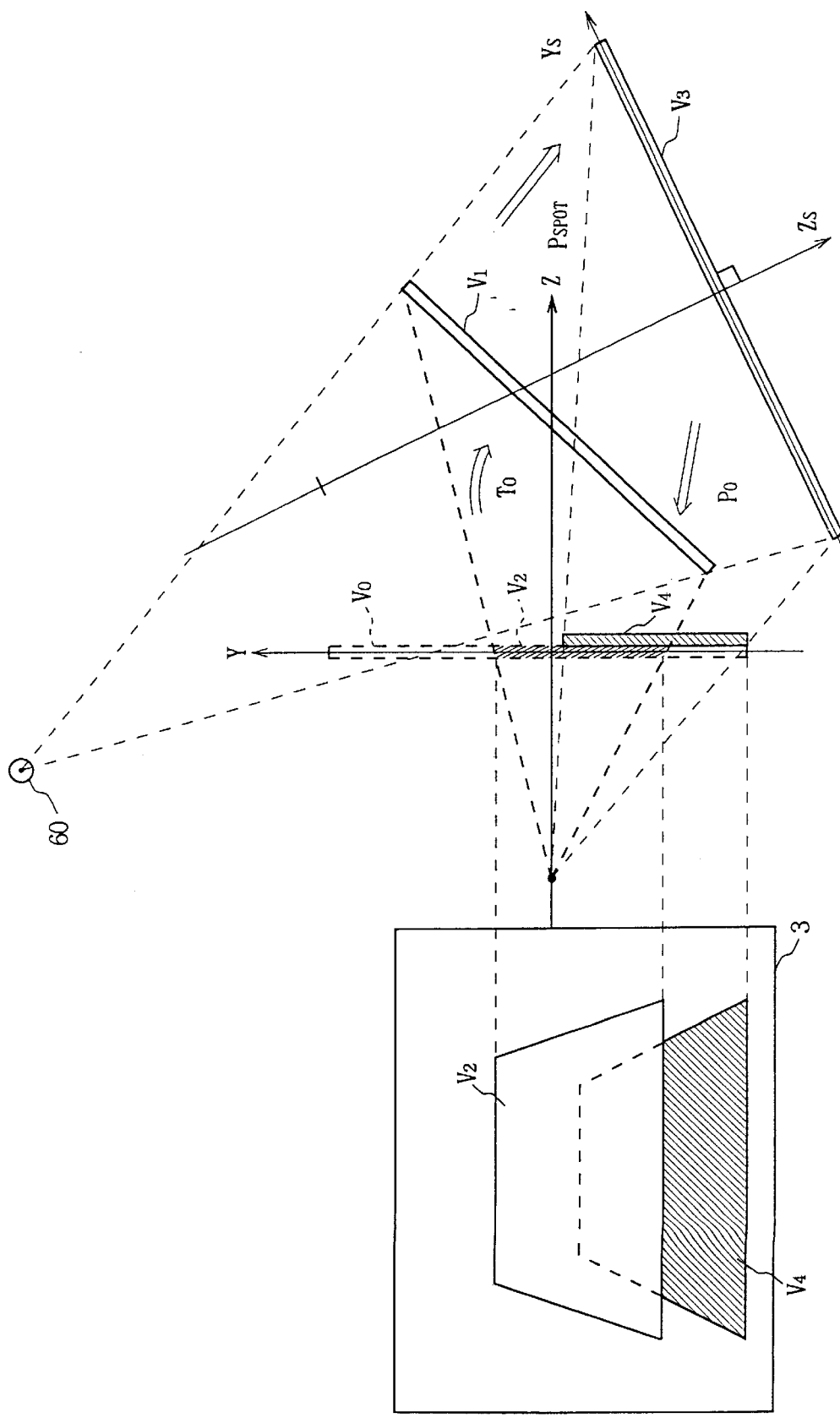
FIG. 7 is a drawing explaining a transformation processing for obtaining a shadow video signal at a point light source mode.

The aforementioned processing shown in FIG. 7B will be summarized. At the point light source mode, the transformation processing for obtaining the 2-D shadow video signal $V_4$ from the 2-D source video signal $V_0$ comprises: a 3-D transformation step for 3-D transforming the object video signal $V_0$ by the 3-D transformation matrix $T_0$ to obtain the 3-D object video signal $V_1$; a perspective transformation step for seeing through the 3-D object video signal $V_1$ on the $X_S$-$Y_S$ plane of the shadow coordinate system by the perspective transformation matrix $P_{SPOT}$ according to the point light source to obtain the 3-D shadow video signal $V_3$; and a step for seeing through the 3-D shadow video signal $V_3$ on the X-Y plane of the world coordinate system by the perspective transformation matrix $P_0$ to obtain the 2-D shadow video signal $V_4$. Therefore, a transformation matrix $T_{shadow}'$ for obtaining the 2-D shadow video signal $V_4$ from the 2-D source video signal $V_0$ is represented as the following equation.

$$T_{shadow}' = T_0 \cdot P_{SOPT} \cdot P_0 \tag{41}$$

Figure 8:
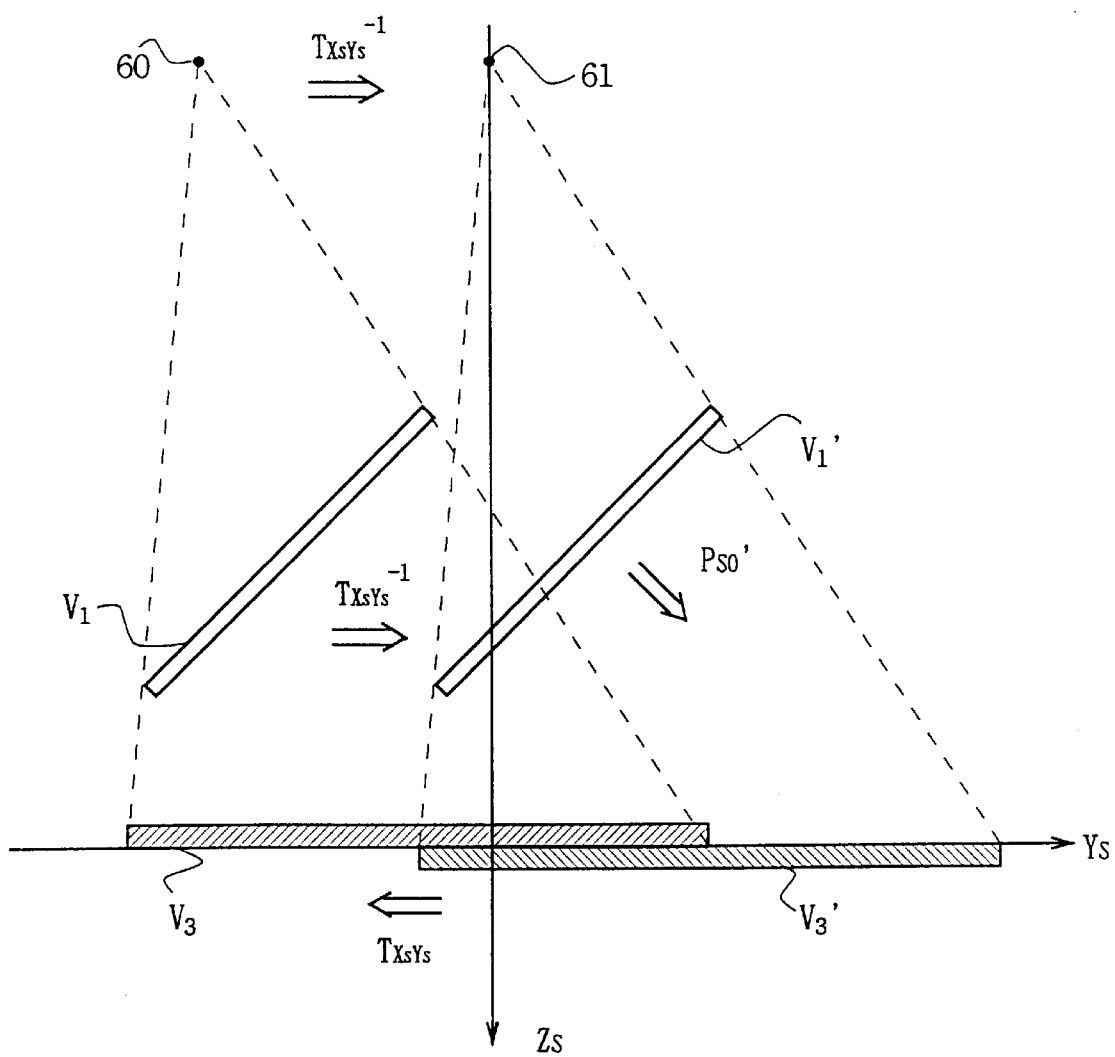
FIG. 8 is a drawing explaining a perspective transformation processing for obtaining a 3-D shadow video signal from a 3-D object video signal at the point light source mode.

Next, the perspective transformation matrix $P_{SPOT}$ according to the point light source in the case of using the point light source will be described with reference to FIGS. 8 and 9. FIG. 8 is a drawing of viewing the $Y_S$-$Z_S$ plane from the $X_S$-axis direction of the shadow coordinate system, and shows the positional relation among a point light source 60, the 3-D object video $V_1$, and the 3-D shadow video $V_3$. Note that, the perspective transformation matrix $P_{SPOT}$ according to the point light source is a transformation matrix for obtaining the 3-D shadow video signal $V_3$ from the 3-D object video $V_1$ at the point light source mode using the point light source.

FIG. 9A shows a flow of a transformation processing for the point light source 60, and FIG. 9B shows a flow of a transformation processing for the object video signal.

First, the flow of the transformation processing for the point light source 60 will be described with reference to FIG. 9A.

At step SP1, the position of the point light source 60 shown in the world coordinate system is transformed into a position in the shadow coordinate system by a transformation matrix $F^{-1}$. As this reason, a perspective transformation matrix $P_{SO}'$, described at the latter step SP5, is not a perspective transformation matrix in the world coordinate system but a perspective transformation matrix in the shadow coordinate system. Therefore, in the case where the 3-D object video signal $V_1$ is seen through on the $X_S$-$Y_S$ plane of the shadow coordinate system by the perspective transformation matrix $P_{SO}'$, it is necessary that a position of the point light source 60 in the world coordinate system is transformed into a position in the shadow coordinate system.

Here, the transformation matrix $F^{-1}$ will be described specifically. First, it is defined that a rotational angle of the $X_S$-axis of the shadow coordinate system with respect to the X-axis of the world coordinate system is "$\theta_X$", a rotational angle of the $Y_S$-axis of the shadow coordinate system with respect to the Y-axis of the world coordinate system is "$\theta_Y$", a rotational angle of the $Z_S$-axis of the shadow coordinate system with respect to the Y-axis of the world coordinate system is "$\theta_Z$", and the origin of the shadow coordinate system is $(x_{SO}, y_{SO}, z_{SO})$. The transformation matrix F from the shadow coordinate system to the world coordinate system, being an inverse matrix relative to the transformation matrix $F^{-1}$ from the world coordinate system to the shadow coordinate system, can be simply represented by a multiplication between a rotational matrix and a translation matrix, so that the transformation matrix F from the shadow coordinate system to the world coordinate system is first obtained. The transformation matrix F from the shadow coordinate system to the world coordinate system can be represented as the following equation.

$$F = R_X(\theta_X) \cdot R_Y(\theta_Y) \cdot R_Z(\theta_Z) \cdot L(x_{SO}, y_{SO}, z_{SO}) \tag{42}$$

Wherein, the matrix $R_X(\theta_X)$, the matrix $R_Y(\theta_Y)$, and the matrix $R_Z(\theta_Z)$ are matrixes for rotation and can be represented as the following equations.

$$R_X(\theta_X) = \begin{bmatrix} 1 & 0 & 0 & 0 \\ 0 & \cos\theta_X & \sin\theta_X & 0 \\ 0 & -\sin\theta_X & \cos\theta_X & 0 \\ 0 & 0 & 0 & 1 \end{bmatrix} \tag{43}$$

$$R_Y(\theta_Y) = \begin{bmatrix} \cos\theta_Y & 0 & -\sin\theta_Y & 0 \\ 0 & 1 & 0 & 0 \\ \sin\theta_Y & 0 & \cos\theta_Y & 0 \\ 0 & 0 & 0 & 1 \end{bmatrix} \tag{44}$$

$$R_Z(\theta_Z) = \begin{bmatrix} \cos\theta_Z & \sin\theta_Z & 0 & 0 \\ -\sin\theta_Z & \cos\theta_Z & 0 & 0 \\ 0 & 0 & 1 & 0 \\ 0 & 0 & 0 & 1 \end{bmatrix} \quad (45)$$

Further, the matrix $L(x_{S0}, y_{S0}, z_{S0})$ is a matrix for translation in parallel and can be represented as the following equation.

$$L(x_{S0}, y_{S0}, z_{S0}) = \begin{bmatrix} 1 & 0 & 0 & 0 \\ 0 & 1 & 0 & 0 \\ 0 & 0 & 1 & 0 \\ x_{S0} & y_{S0} & z_{S0} & 1 \end{bmatrix} \quad (46)$$

Therefore, since the transformation matrix F from the shadow coordinate system to the world coordinate system is an inverse matrix with the transformation matrix $F^{-1}$ from the world coordinate system to the shadow coordinate system, the transformation matrix $F^{-1}$ can be represented as the following equation.

$$F^{-1} = L^{-1}(x_{S0}, y_{S0}, z_{S0}) \cdot R_X^{-1}(\theta_X) \cdot R_Y^{-1}(\theta_Y) \cdot R_Z^{-1}(\theta_Z)$$
$$= L(-x_{S0}, -y_{S0}, -z_{S0}) \cdot R_X(-\theta_X) \cdot R_Y(-\theta_Y) \cdot R_Z(-\theta_Z) \quad (47)$$

Wherein, the matrix $R_X(-\theta_X)$, the matrix $R_Y(-\theta_Y)$ and the matrix $R_Z(-\theta_Z)$ are matrixes for rotation and can be represented as the following equations.

$$R_X(-\theta_X) = \begin{bmatrix} 1 & 0 & 0 & 0 \\ 0 & \cos(-\theta_X) & \sin(-\theta_X) & 0 \\ 0 & -\sin(-\theta_X) & \cos(-\theta_X) & 0 \\ 0 & 0 & 0 & 1 \end{bmatrix} \quad (48)$$

$$R_Y(-\theta_Y) = \begin{bmatrix} \cos(-\theta_Y) & 0 & -\sin(-\theta_Y) & 0 \\ 0 & 1 & 0 & 0 \\ \sin(-\theta_Y) & 0 & \cos(-\theta_Y) & 0 \\ 0 & 0 & 0 & 1 \end{bmatrix} \quad (49)$$

$$R_Z(-\theta_Z) = \begin{bmatrix} \cos(-\theta_Z) & \sin(-\theta_Z) & 0 & 0 \\ -\sin(-\theta_Z) & \cos(-\theta_Z) & 0 & 0 \\ 0 & 0 & 1 & 0 \\ 0 & 0 & 0 & 1 \end{bmatrix} \quad (50)$$

Further, the matrix $L(-X_{S0}, -Y_{S0}, -Z_{S0})$ is a matrix for translation in parallel and can be represented as the following equation.

$$L(-x_{S0}, -y_{S0}, -z_{S0}) = \begin{bmatrix} 1 & 0 & 0 & 0 \\ 0 & 1 & 0 & 0 \\ 0 & 0 & 1 & 0 \\ -x_{S0} & -y_{S0} & -z_{S0} & 1 \end{bmatrix} \quad (51)$$

At step SP2, as shown in FIG. 8, the position of the point light source 60 is translated to a position of a virtual point light source 61 on the $Z_S$-axis by a translation matrix $T_{X_S Y_S}^{-1}$. It is because, in order to obtain the 3-D shadow video $V_3$ with respect to the 3-D object video $V_1$, when the 3-D object video $V_1$ is viewed from the position of the point light source 60, the 3-D shadow video $V_3$ can be obtained by seeing through the 3-D object video $V_1$ on the $X_S$-$Y_S$ plane of the shadow coordinate system. However, it is necessary for performing the perspective transformation processing that the point light source being a view point is positioned on the $Z_S$-axis. So, the position of the point light source 60 is translated to the position of the virtual light source 61 on the Xs-axis by the translation matrix $T_{X_S Y_S}^{-1}$.

Here, the coordinate of the point light source 60 which has been set beforehand by the operator is defined as $(x_L, y_L, z_L)$, the translation matrix $T_{X_S Y_S}^{-1}$ can be represented as the following equation.

$$T_{X_S Y_S}^{-1} = \begin{bmatrix} 1 & 0 & 0 & 0 \\ 0 & 1 & 0 & 0 \\ 0 & 0 & 1 & 0 \\ -x_L & -y_L & 0 & 1 \end{bmatrix} \quad (52)$$

The transformation processing for the point light source is completed by step SP1 and step SP2.

Next, a perspective transformation matrix $P_{SPOT}$ for producing a 3-D shadow video signal from the 3-D object video signal $V_1$ will be described with reference to FIG. 9B.

At step SP3, as with step SP1, the 3-D object video signal $V_1$ shown in the world coordinate system is transformed into a signal of the shadow coordinate system by the transformation matrix $F^{-1}$. This reason is that a perspective transformation matrix $P_{S0}'$, used at step SP5 described below, is not a perspective transformation matrix in the world coordinate system but a perspective transformation matrix in the shadow coordinate system. Therefore, in the case where the 3-D object video $V_1$ is seen through on the $X_S$-$Y_S$ plane of the shadow coordinate system by the perspective transformation matrix $P_{S0}'$, it is necessary that the 3-D object video $V_1$ shown in the world coordinate system is transformed into a signal of the shadow coordinate system.

At step SP4, as with step SP2, the 3-D object video signal $V_1$ is translated in parallel with the $X_S$-$Y_S$ plane of the shadow coordinate system by the translation matrix $T_{X_S Y_S}^{-1}$ as shown in FIG. 8. In FIG. 8, the translated video signal is defined as a virtual 3-D object video signal $V_1'$. The video signal is translated in parallel because of the following reason. Since the position of the point light source 60 is translated in parallel by the translation matrix $T_{X_S Y_S}^{-1}$ so as to be positioned at the virtual light source 61 on the $Z_S$-axis, the 3-D object video signal $V_1$ needs to be also translated in parallel by the translation matrix $T_{X_S Y_S}^{-1}$ so that a relative positional relation of the 3-D object video signal $V_1$ with respect to the point light source 60 and a relative positional relation of the virtual object video signal $V_1'$ with respect to the virtual point light source 61 are not changed.

Next, at step SP5, the virtual 3-D object video signal $V_1'$ is seen through on the $X_S$-$Y_S$ plane of the shadow coordinate system by a perspective transformation matrix $P_{S0}$. In FIG. 8, a video signal seen through on the $X_S$-$Y_S$ plane of the shadow coordinate system is referred to as a virtual 3-D shadow video signal $V_3'$. The virtual 3-D shadow video signal $V_3'$ is seen through on the $X_S$-$Y_S$ plane of the shadow coordinate system, with the virtual point light source 61 being as a view point, when the virtual object video signal $V_1'$ is viewed from the virtual point light source 61.

Specifically, it may be considered from the relation between the perspective transformation matrix $P_0$ shown in the equation (2) and the view point $P_z$ that a view point at the perspective transformation is positioned at the virtual point light source 61, that is, $(0,0,z_L)$, so that the perspective transformation matrix $P_{S0}'$ can be obtained by substituting "$-1/z_L$" for "$P_z$" in the equation (2). Thereby, the perspective transformation matrix $P_{S0}'$ can be represented as the following equation.

$$P'_{SO} = \begin{bmatrix} 1 & 0 & 0 & 0 \\ 0 & 1 & 0 & 0 \\ 0 & 0 & 0 & -1/z_L \\ 0 & 0 & 0 & 1 \end{bmatrix} \quad (53)$$

Next, at step SP6, the virtual shadow video signal $V_3'$ is translated on the $X_S$-$Y_S$ plane of the shadow coordinate system in parallel by the translation matrix $T_{X_S Y_S}$. In FIG. 8, the translated video signal is referred to as a 3-D shadow video signal $V_3$. As can be seen from FIG. 8, the 3-D shadow video signal $V_3$ is seen through on the $X_S$-$Y_S$ plane of the shadow coordinate system, with the point light source 60 being as a view point, when the 3-D object video signal $V_1$ is viewed from the position of the point light source 60. The video signal is translated in parallel because of the following reason. Since the 3-D object video signal $V_1$ is translated in parallel by the translation matrix $T_{X_S Y_S}^{-1}$ at step SP4, the signal translated in parallel by the translation matrix $T_{X_S Y_S}^{-1}$ is restored.

Here, the translation matrix $T_{X_S Y_S}$ is an inverse matrix of the translation matrix $T_{X_S Y_S}^{-1}$, so that the translation matrix $T_{X_S Y_S}$ can be represented as the following equation.

$$T_{X_S Y_S} = \begin{bmatrix} 1 & 0 & 0 & 0 \\ 0 & 1 & 0 & 0 \\ 0 & 0 & 1 & 0 \\ x_L & y_L & 0 & 1 \end{bmatrix} \quad (54)$$

Next, at step SP7, the 3-D shadow video signal $V_3$ represented in the shadow coordinate system is transformed into a signal represented in the world coordinate system by the transformation matrix F shown by the equation (42). Thereby, the 3-D shadow video signal $V_3$ represented with the coordinate value of the world coordinate system can be obtained.

A processing shown in the flow of FIG. 9B will be summarized. The processing for obtaining the 3-D shadow video signal of the world coordinate system from the 3-D objet video signal $V_1$ of the world coordinate system comprises: a step (SP3) of transforming the 3-D object video signal $V_1$ from the world coordinate system to the shadow coordinate system; a step (SP4, SP5, and SP6) of projecting the 3-D object video signal onto the $X_S$-$Y_S$ plane of the shadow coordinate system to produce the 3-D shadow video signal of the shadow coordinate system; and a step (SP7) of transforming the 3-D shadow video signal of the shadow coordinate from the shadow coordinate system to the world coordinate system.

Accordingly, the perspective transformation matrix $P_{SPOT}$ according to the point light source for obtaining a 3-D shadow video signal of the world coordinate system from the 3-D shadow video signal $V_1$ of the world coordinate system can be represented by the multiplication among the transformation matrix $F^{-1}$, the translation matrix $T_{X_S Y_S}^{-1}$, the perspective transformation matrix $P_{SO}'$, the translation matrix $T_{X_S Y_S}^{-1}$, and the transformation matrix $F^{-1}$, so the perspective transformation matrix $P_{SPOT}$ can be represented as the following equation.

$$P_{SPOT} = F^{-1} \cdot T_{X_S Y_S}^{-1} \cdot P_{SO}' \cdot T_{X_S Y_S}^{-1} \cdot F^{-1} \quad (55)$$

Therefore, by substituting the transformation matrix $P_{SPOT}$ for the equation (41), the transformation matrix $T_{shadow}'$ for obtaining the 2-D shadow video signal $V_4$ from the 2-D source video signal at the point light source mode can be represented as the following equation.

$$T_{shadow}' = T_0 \cdot P_{SPOT} \cdot P_0 \quad (56)$$
$$= T_0 \cdot F^{-1} \cdot T_{X_S Y_S}^{-1} \cdot P_{SO}' \cdot T_{X_S Y_S}^{-1} \cdot F^{-1} \cdot P_0$$

Here, a method of calculating a read address for reading the shadow video signal $V_4$ from the frame memory 22, on the basis of the transformation matrix $T_{shadow}'$, is the same as a calculation method of obtaining the read address $(X_M, Y_M)$ for reading the object video signal $V_2$ from the frame memory 12, on the basis of the matrix $T_{obj}$ shown in the equation (3). That is, the calculation method is the same as the calculation shown in the equations (3) to (14).

Specifically, since the transformation matrix $T_{shadow}'$ is a 4×4 matrix, with as the equation (4), a matrix in which the constituents (third line and third row) of the Z-axis direction are excluded is referred to as $T_{33shadow}'$. Respective parameters of an inverse matrix $(T_{33shadow}')^{-1}$ relative to the matrix $T_{33shadow}'$ are defined as the following equation.

$$(T'_{33shadow})^{-1} = \begin{bmatrix} b'_{11} & b'_{12} & b'_{13} \\ b'_{21} & b'_{22} & b'_{23} \\ b'_{31} & b'_{32} & b'_{33} \end{bmatrix} \quad (57)$$

Further, a read address which is supplied from the read address generating circuit 24 of the shadow signal producing section 20 is defined as $(X_M', Y_M')$. With reference to the calculation from the equation (3) to the equation (14), the read address $(X_M', Y_M')$ can be represented as the following equations.

$$X'_M = \frac{b'_{11} X_S + b'_{21} Y_S + b'_{31}}{b'_{13} X_S + b'_{23} Y_S + b'_{33}} \quad (58)$$

$$Y'_M = \frac{b'_{12} X_S + b'_{22} Y_S + b'_{32}}{b'_{13} X_S + b'_{23} Y_S + b'_{33}} \quad (59)$$

Therefore, the read address $(X_M', Y_M')$ which is supplied to the frame memory 22 can be represented by using respective parameters ("$r_{11}$" to "$r_{33}$", "$l_x$", "$l_y$", "$l_z$", and "s") of the 3-D transformation matrix $T_0$ decided by the spatial image transformation processing desired by the operator, the perspective value "$P_z$" which is a parameter set beforehand, the position $(x_L, y_L, z_L)$ of the point light source, the rotational angles $(\theta_X, \theta_Y, \theta_Z)$ of respective axes in the shadow coordinate system, and the origin $(x_{SO}, y_{SO}, z_{SO})$ of shadow coordinate system.

Accordingly, the screen address $(X_S, Y_S)$ for addressing so as to correspond to the order of the raster scan of the monitor screen 3 is supplied to the equations (6) to (40). Then, the read address $(X_M', Y_M')$, corresponding to the supplied screen address, on the frame memory 22 can be calculated successively. Thereby, the 2-D shadow video signal $V_4$ corresponding to the 2-D object video signal $V_2$ can be produced.

Figures 10A, 10B:
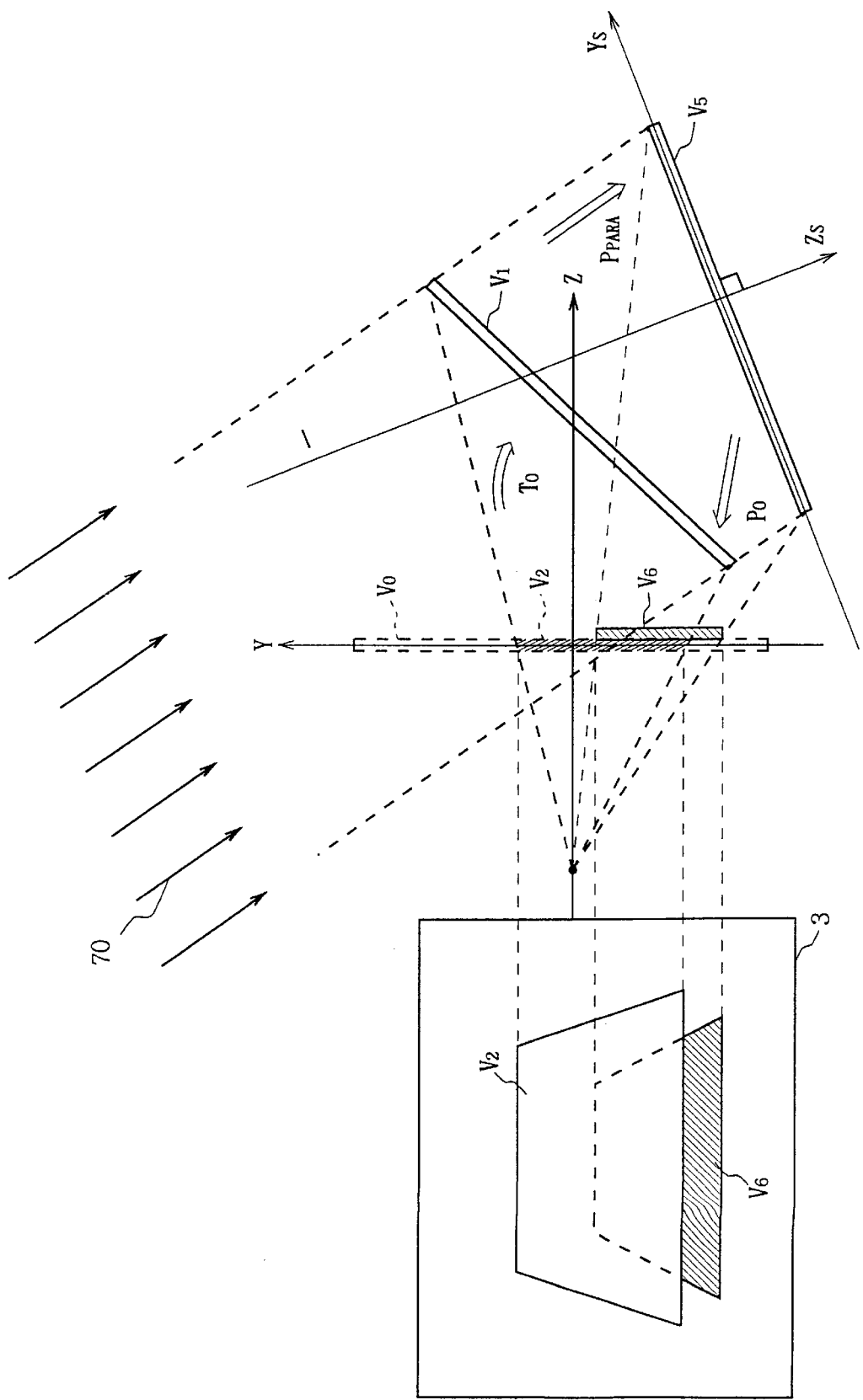
FIG. 10 is a drawing explaining a transformation processing for obtaining the shadow video signal at a parallel light source mode.

(6) Explanation of the transformation processing for producing a shadow video signal at the parallel light source mode First, a transformation processing for obtaining a 3-D shadow video signal $V_5$ from the 3-D object video signal $V_1$ at the parallel light source mode using the parallel light source will be described, with reference to FIGS. 10A and 10B. Note that, with as FIGS. 7A and 7B, FIG. 10A is a drawing of viewing the X-Y plane of the world coordinate system from the view point PZ set on the Z-axis of the world coordinate system, and FIG. 10B is a drawing of viewing the Y-Z plane of the world coordinate system from a plus position of the X-axis of the world coordinate system.

First, the 3-D object video signal $V_1$, transformed to the 3-D spatial position by the 3-D transformation matrix $T_0$, is projected onto the $X_S$-$Y_S$ plane of the shadow coordinate system by a perspective transformation matrix $P_{PARA}$ according to the parallel light source. In FIG. 10B, the video signal seen through on the $X_S$-$Y_S$ plane of the shadow coordinate system is referred to as a 3-D shadow video signal $V_5$. The perspective transformation matrix $P_{PARA}$ according to the parallel light source is a transformation matrix for perspectively transforming the 3-D object video signal $V_1$ to obtain the 3-D shadow video signal $V_5$.

Next, the 3-D shadow video signal $V_5$ is projected onto the X-Y plane of the world coordinate system by the aforementioned perspective transformation matrix $P_0$. It means, when the 3-D shadow video signal $V_5$ is viewed from the virtual view point PZ on the Z-axis, a video signal which is seen through on the X-Y plane of the world coordinate system is obtained. In FIG. 10B, a video signal, seen through on the X-Y plane of the world coordinate system, is referred to as a 2-D shadow video signal $V_6$.

Figures 11A, 11B:
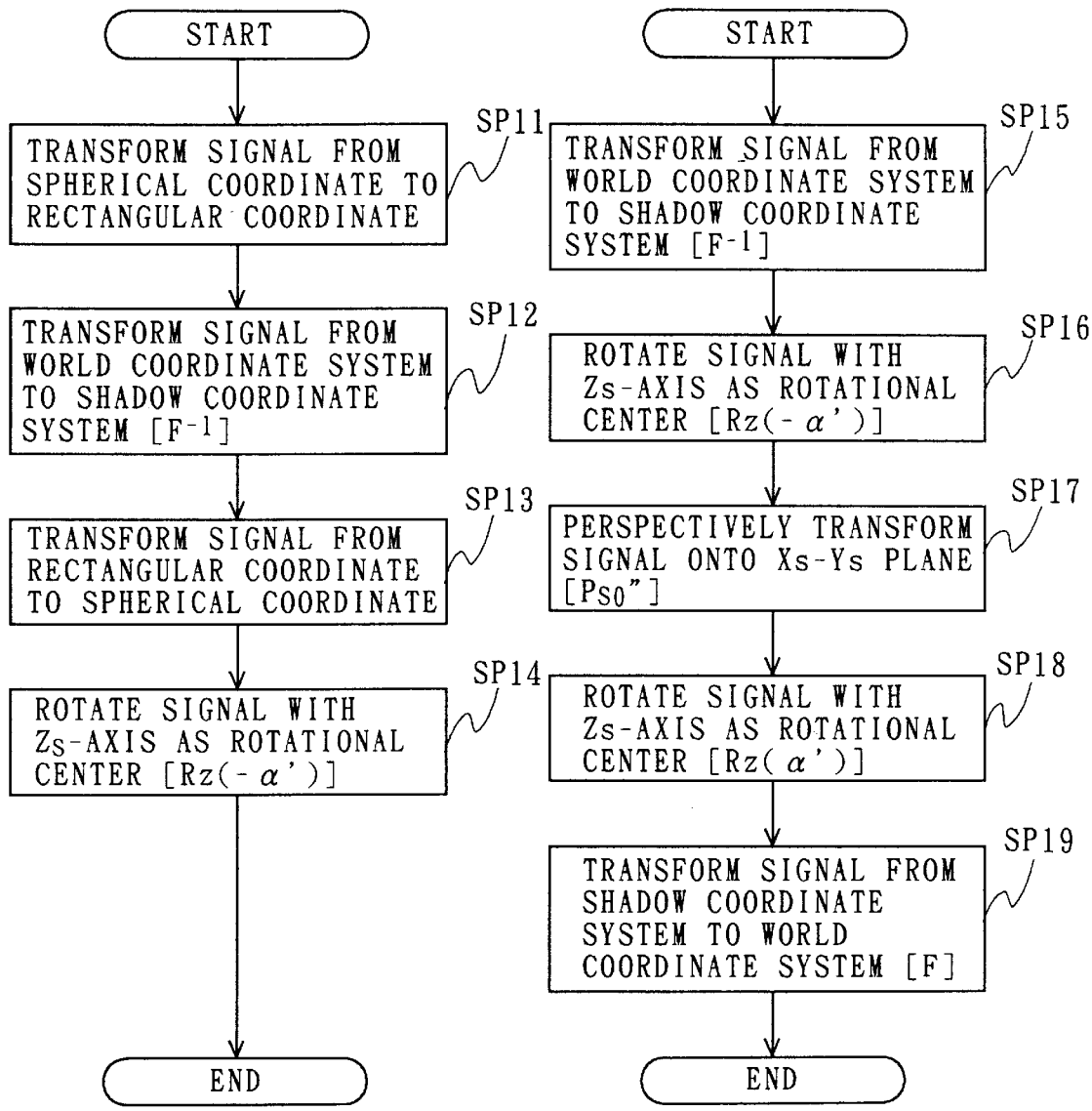
FIG. 11 is a flow showing a procedure of performing a transformation processing for a parallel light source and the 3-D object video signal.

A aforementioned processing shown by a flow of FIG. 11B will be summarized. A transformation processing for obtaining the 2-D shadow video signal $V_6$ from the 2-D source video signal $V_0$ comprises: a 3-D transformation step of 3-D transforming the source video signal $V_0$ by the 3-D transformation matrix $T_0$ to obtain the 3-D object video signal $V_1$; a perspective transformation step of seeing through the 3-D object video signal $V_1$ on the $X_S$-$Y_S$ plane of the shadow coordinate system by the perspective transformation matrix $P_{PARA}$ according to the parallel light source to obtain the 3-D shadow video signal $V_5$; and a step of seeing through the 3-D shadow video signal $V_5$ on the X-Y plane of the world coordinate system by the perspective transformation matrix $P_0$ to obtain the 2-D shadow video signal $V_6$. Therefore, a transformation matrix $T_{shadow}''$ for obtaining the 2-D shadow video signal $V_6$ from the 2-D source video signal $V_0$ can be represented as the following equation.

$$T_{shadow}'' = T_0 \cdot P_{PARA} \cdot P_0 \quad (60)$$

Next, the perspective transformation matrix $P_{PARA}$ according to the parallel light source on using the parallel light source will be described with reference to FIGS. 11 to 14.

FIG. 11A shows a flow of the transformation processing for a parallel light source 70, and FIG. 11B shows a flow of the transformation processing for the 3-D object video signal $V_1$.

First, with reference to FIG. 11A, the transformation processing for the parallel light source 70 will be described.

Figure 12A:
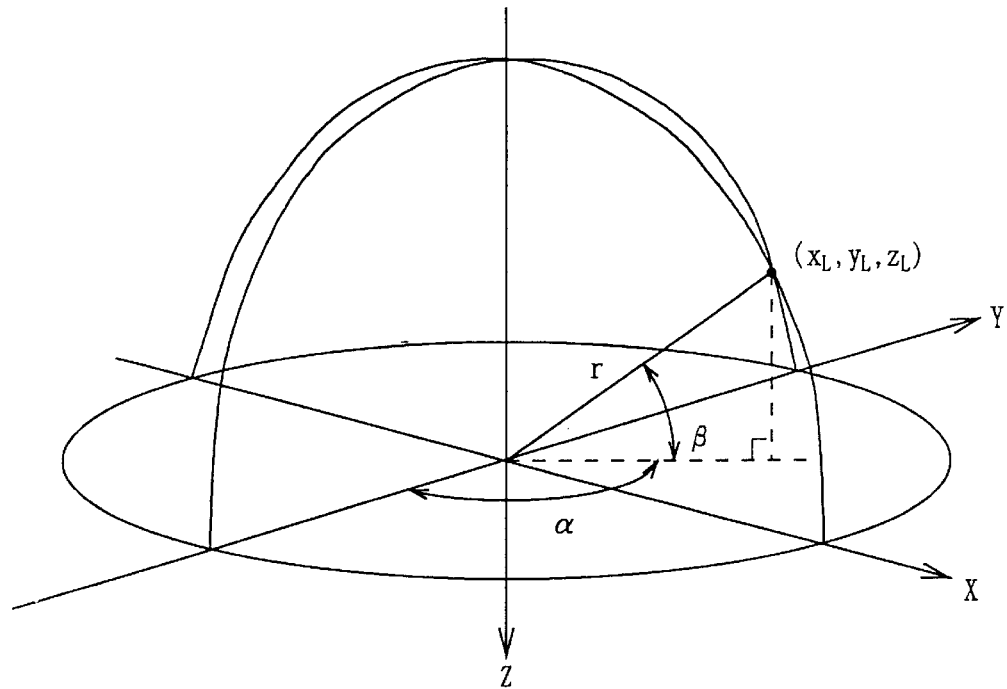
FIG. 12 is a drawing showing the relation between spherical coordinates and rectangular coordinates respectively in the world coordinate system and in the shadow coordinate system.

At step SP11, a coordinate of the parallel light source 70 which is defined by a spherical coordinate in the world coordinate system is transformed into a coordinate of a rectangular coordinate in the world coordinate system. A position of the parallel light source is generally represented in the spherical coordinate system than in the rectangular coordinate system. The spherical coordinate system is a coordinate system which represents the position of the parallel light source by using a radius ($\Gamma$), a latitude ($\alpha$), and a longitude ($\beta$). FIG. 12A shows a relation between the rectangular coordinate system and the spherical coordinate system in the world coordinate system. As shown in FIG. 12A, in the relation between the rectangular coordinate system and the spherical coordinate system, the basis of the latitude $\alpha$ is defined as a minus direction of the Y-axis and the basis of the longitude is defined as the X-Y plane. That is, the equator plane of the spherical coordinate coincides with the X-Y plane of the rectangular coordinate, and the direction of the longitude 0 (rad) and the latitude 0 (rad) coincides with the minus direction of the Y-axis. Therefore, assuming that the position of the parallel light source 70 defined in the spherical coordinate is ($\Gamma,\alpha,\beta$) and the position of the parallel light source transformed into a position of the rectangular coordinate is ($x_L, y_L, z_L$), the light source position ($x_L, y_L, z_L$) can be represented as the following equations.

$$\left. \begin{aligned} x_L &= r\cos\beta\cos\alpha \\ y_L &= r\cos\beta\sin\alpha \\ z_L &= -r\sin\beta \end{aligned} \right\} \quad (61)$$

Therefore, in order to transform the position of the light source from the spherical coordinate to the rectangular coordinate, the light source position ($x_L, y_L, z_L$) transformed into the position of the rectangular coordinate can be obtained by substituting the light source position ($\Gamma,\alpha,\beta$) of the spherical coordinate system set by the operator for the equation (61).

At step SP12, the coordinate of the parallel light source is transformed from the world coordinate system to the shadow coordinate system by the transformation matrix $F^{-1}$. The explanation of the transformation matrix $F^{-1}$ is omitted because it has been described at step SP1. When the position of the light source transformed to the shadow coordinate system is defined as ($x_L', y_L', z_L'$), the relation among the light source vector $[x_L\ y_L\ z_L\ 1]$ of the world coordinate system, represented in the homogeneous coordinate, and the light source vector $[x_L'\ y_L'\ z_L'\ 1]$ of the shadow coordinate system, represented in the homogeneous coordinate, and the transformation matrix $F^{-1}$ can be represented as the following equation.

$$[x_L'\ y_L'\ z_L'\ 1] = [x_L\ y_L\ z_L\ 1] \cdot F^{-1} \quad (62)$$

Figure 12B:
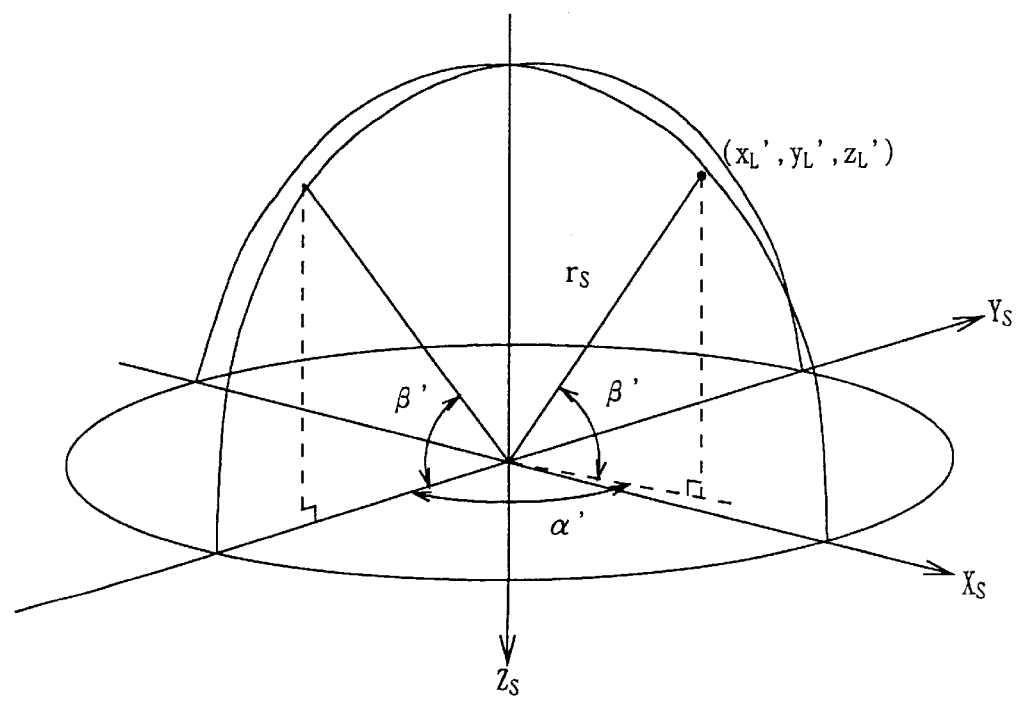

At step 13, the position ($x_L', y_L', z_L'$) of the light source, obtained at step SP12, in the rectangular coordinate of the shadow coordinate system is transformed so as to be represented with the spherical coordinate of the shadow coordinate system. FIG. 12B is a diagram showing the relation between the rectangular coordinate and the spherical coordinate in the shadow coordinate system. As shown in FIG. 12B, in the relation between the rectangular coordinate and the spherical coordinate in the shadow coordinate system, the basis of the latitude ($\alpha_s$) is defined as a minus direction of the $Y_S$-axis and the basis of the longitude ($\beta_s$) is defined as the $X_S$-$Y_S$ plane. That is, the equator plane of the spherical coordinate is the same as the $X_S$-$Y_S$ plane of the rectangular coordinate, and the direction of the latitude 0 (rad) and longitude 0 (rad) is the same as the minus direction of the $Y_S$-axis.

Therefore, the relation between the light source position ($x_L', y_L', z_L'$) represented with the rectangular coordinate in the shadow coordinate system and the light source position ($\Gamma', \alpha', \beta'$) represented with the spherical coordinate in the shadow coordinate system is represented as the following equations.

$$\left. \begin{aligned} r' &= \sqrt{(x_L')^2 + (y_L')^2 + (z_L')^2} \\ \alpha' &= \tan^{-1}(-x_L', y_L') \\ \beta' &= \sin^{-1}(z_L', r) \end{aligned} \right\} \quad (63)$$

Therefore, the position of the parallel light source 70 can be represented with the spherical coordinate in the shadow coordinate system by substituting the light source position $(x_L',y_L',z_L')$, obtained at step SP12, for the equation (63).

Figure 13:
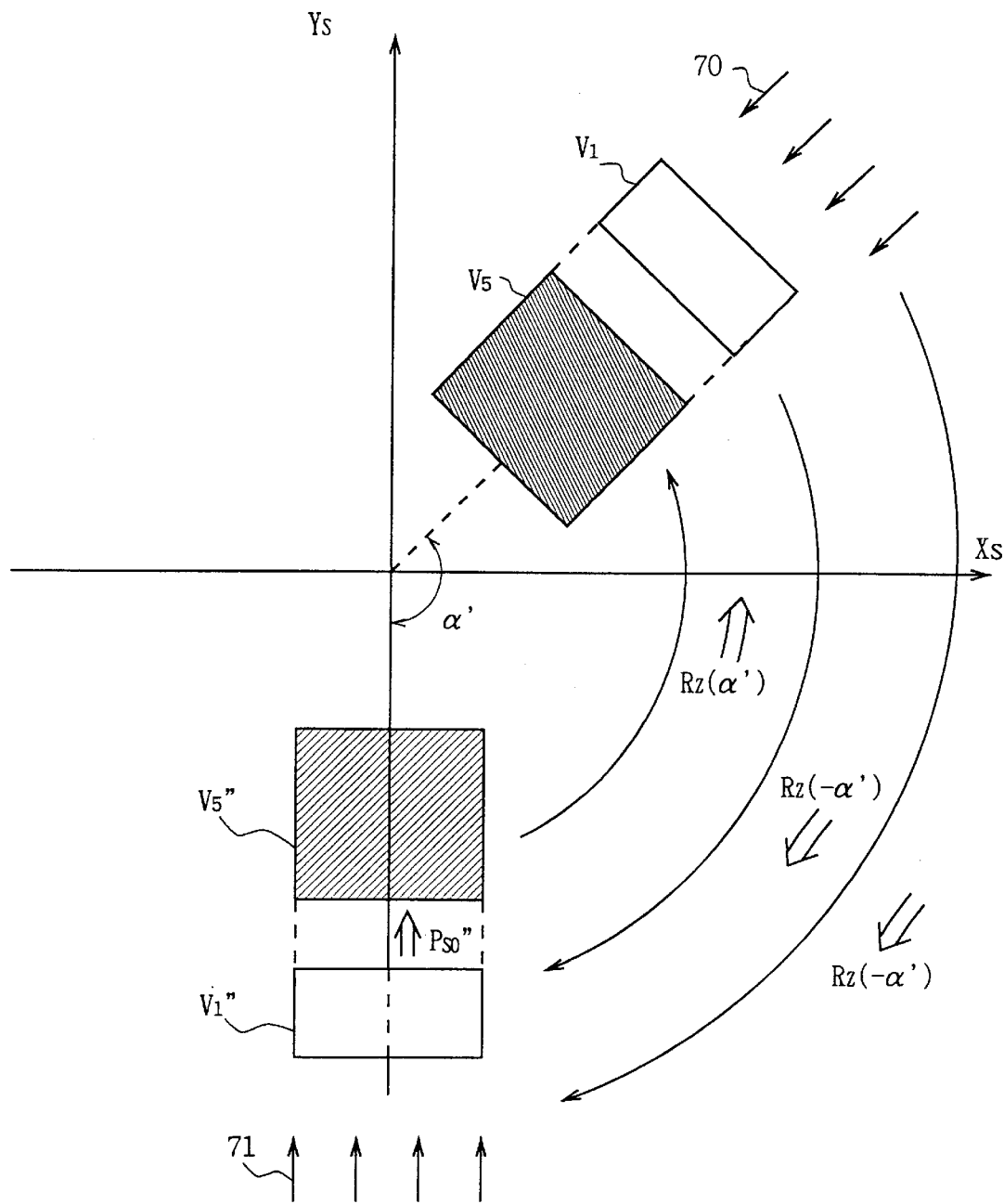
FIG. 13 is a drawing explaining a perspective transformation processing for obtaining a 3-D shadow video signal from the 3-D object video signal at the parallel light source mode.

Next, at step SP14, as shown in FIG. 13, the position $(\Gamma', \alpha', \beta')$ of the parallel light source obtained at step 13 is rotated by $-\alpha'$ (rad) around the $Z_S$-axis of the shadow coordinate system by the rotational matrix $R_Z(-\alpha')$. That is, the position of the parallel light source after the rotational processing can be represented as $(\Gamma',0,\beta')$. In FIG. 13, the light source rotated by the rotational matrix $R_Z(-\alpha')$ is referred to as a virtual parallel light source 71. Therefore, by rotating the position of the parallel light source 70, the light beam of the parallel light source 71 becomes parallel to the $Y_S$-$Z_S$ plane as shown in FIG. 11. The reason of rotationally transforming the parallel light source so that the light beam of the parallel light source 71 becomes parallel to the $Y_S$-$Z_S$ plane is that, if the light beam of the parallel light source to be emitted is parallel to the $Y_S$-$Z_S$ plane when the object video signal $V_1$ is seen through on the $X_S$-$Y_S$ plane of the shadow coordinate system by the perspective transformation matrix $P_{SO}''$ at later step SP 17, the coordinate value of the $X_S$-axis direction does not changed even if the 3-D object video signal is seen through on the $X_S$-$Y_S$ plane, so that the perspective transformation matrix for seeing through the object video signal on the $X_S$-$Y_S$ plane is represented very easily.

Specifically, since the rotational matrix $R_Z(-\alpha')$ is a rotational matrix around the $Z_S$-axis, the rotational matrix $(-\alpha')$ can be represented as the following equation.

$$R_z(-\alpha') = \begin{bmatrix} \cos(-\alpha') & \sin(-\alpha') & 0 & 0 \\ -\sin(-\alpha') & \cos(-\alpha') & 0 & 0 \\ 0 & 0 & 1 & 0 \\ 0 & 0 & 0 & 1 \end{bmatrix} \quad (64)$$

The transformation processing for the parallel light source 70 is completed by the steps of SP11, SP12, SP13, and SP14.

Next, the perspective transformation matrix $P_{PARA}$ for producing the 3-D shadow video signal $V_5$ from the 3-D object video signal $V_1$ at the parallel light source mode using the parallel light source will be described with reference to FIG. 11B.

At step SP15, as with step SP11, the 3-D object video signal $V_1$ of the world coordinate system is transformed into a signal of the shadow coordinate system by the transformation matrix $F^{-1}$. This reason is that, as with the processing for the parallel light source described at step SP11, a perspective transformation matrix $P_{SO}''$ described later is not a perspective transformation matrix in the world coordinate system but a perspective transformation matrix in the shadow coordinate system. Therefore, in the case where the 3-D object video $V_1$ is seen through on the $X_S$-$Y_S$ plane in the shadow coordinate system, it is necessary that the position of each pixel of the 3-D object video $V_1$ represented in the world coordinate system is transformed from the world coordinate system to the shadow coordinate system.

At step SP16, the object video signal $V_1$, which has been transformed into a signal of the shadow coordinate system at step SP15, is rotated by $-\alpha'$ (rad) around the Z-axis by the rotational matrix $R_Z(-\alpha')$. This reason is that, as shown in FIG. 13, the position $(\Gamma', \alpha', \beta')$ of the parallel light source 70 is rotated by $-\alpha'$ (rad) around the Z-axis by the rotational matrix $R_Z(-\alpha')$ at step SP14, so that it is necessary that the object video signal $V_1$ is rotated so as to correspond to the rotational processing of the parallel light source 70. As show in FIG. 13, the 3-D object video signal rotated by $-\alpha'$ (rad) around the $Z_S$-axis by the rotational matrix $R_Z(-\alpha')$ is referred to as a virtual 3-D object video signal $V_1''$. Therefore, the relative positional relation between the 3-D object video signal $V_1$ and the parallel light source 70 with respect to the origin of the shadow coordinate system is completely the same as the relative positional relation between the virtual 3-D object video signal $V_1''$ and the virtual parallel light source 71 with respect to the origin of the shadow coordinate system.

Figure 14A:
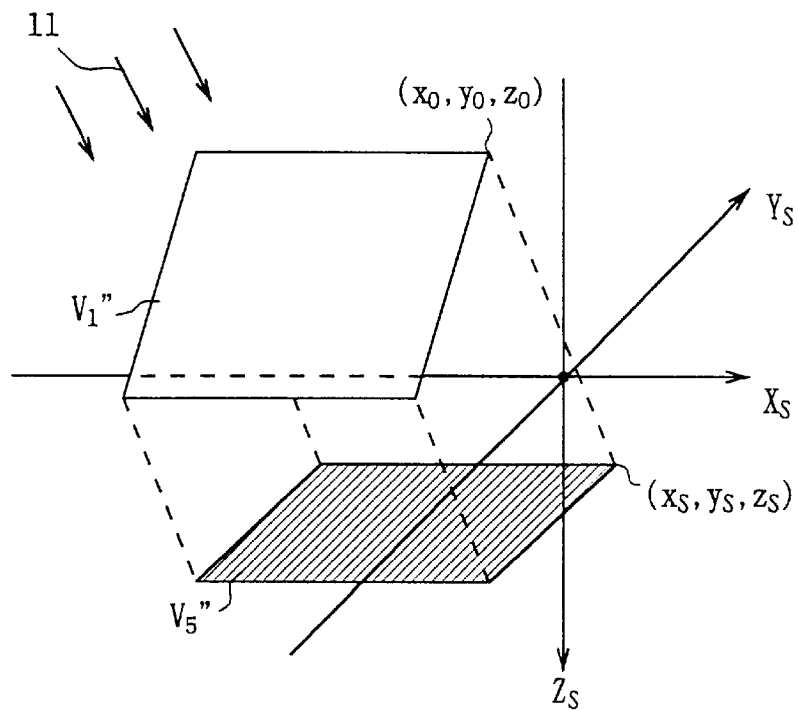
FIG. 14 is a drawing explaining a perspective transformation processing for obtaining a virtual 3-D shadow video signal from a virtual 3-D object video signal.
Figure 14B:
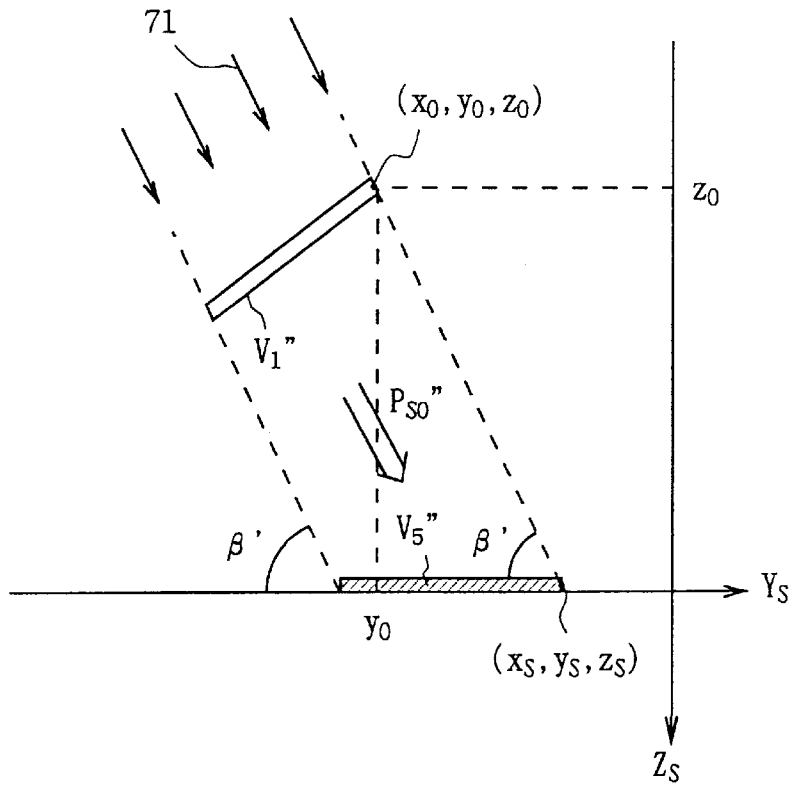

Next, at step SP17, the virtual 3-D object video signal $V_1''$ is seen through on the $X_S$-$Y_S$ plane of the shadow coordinate system by the perspective transformation matrix $P_{SO}''$. The perspective transformation matrix will be described with reference to FIGS. 14A and 14B. First, as shown in FIGS. 13, 14A, and 14B, a video signal, in which the virtual object video signal $V_1''$ is seen through on the $X_S$-$Y_S$ plane by the perspective transformation matrix $P_{SO}''$, is referred to as a virtual 3-D shadow video signal $V_5''$. FIG. 12A is a drawing showing a 3-D positional relation between the virtual 3-D object video signal $V_1''$ and the virtual 3-D shadow video signal $V_5''$, and FIG. 12B is a drawing showing the positional relation between the virtual 3-D object video signal $V_1''$ and the virtual 3-D shadow video signal $V_5''$ in the case of viewing the $Y_S$-$X_S$ plane from the plus direction of the $X_S$-axis. Here, the pixel point on the virtual object video signal $V_1''$ is defined as $(x_0,y_0,z_0)$ and the pixel point on the virtual shadow video signal $V_5$, produced by seeing through the pixel $(x_0,y_0,z_0)$ on the $X_S$-$Y_S$ plane by the perspective transformation matrix $P_{SO}''$, is defined as $(x_s,y_s,z_s)$ the following relation can be obtained from the geometrical relation shown in FIG. 14B.

$x_s = x_0$ $y_s = y_0 + z_0 \cot \beta'$ \quad (65)

$z_s = 0$

Further, the relation among the point $(x_0,y_0,z_0)$ on the virtual object video signal $V_1''$, the point $(x_s,y_s,z_s)$ on the virtual shadow video signal $V_5$, and the perspective transformation matrix $P_{SO}''$ can be represented as the following equation.

$[x_s\ y_s\ z_s\ 1] = [x_0\ y_0\ z_0\ 1] \cdot P_{SO}''$ \quad (66)

Therefore, the following equation can be obtained from the equations (65) and (66).

$$P_{SO}'' = \begin{bmatrix} 1 & 0 & 0 & 0 \\ 0 & 1 & 0 & 0 \\ 0 & \cot\beta' & 1 & 0 \\ 0 & 0 & 0 & 1 \end{bmatrix} \quad (67)$$

Next, at step SP18, the virtual shadow video signal $V_5''$ is rotated around the $Z_S$-axis by the rotational matrix $R_Z(\alpha')$. In FIG. 13, the rotated video signal is referred to as a 3-D shadow video signal $V_5$. As can be seen from FIG. 13, the 3-D shadow video signal $V_5$ is what the 3-D object video signal $V_1$ is seen through on the $X_S$-$Y_S$ plane in the shadow coordinate system by the parallel light source 70. The reason of the transformation is that the 3-D object video signal $V_1$ is rotated by the rotational matrix $R_Z(-\alpha')$ at step 16, so that the rotational processing by the rotational matrix $R_Z(-\alpha')$ is restored.

That is, since the rotational matrix $R_Z(-\alpha')$ is an inverse matrix to the rotational matrix $R_Z(\alpha')$, the rotational matrix $R_Z(\alpha')$ can be represented as the following equation.

$$R_z(\alpha') = \begin{bmatrix} \cos(\alpha') & \sin(\alpha') & 0 & 0 \\ -\sin(\alpha') & \cos(\alpha') & 0 & 0 \\ 0 & 0 & 1 & 0 \\ 0 & 0 & 0 & 1 \end{bmatrix} \quad (68)$$

Next, at step SP19, the 3-D shadow video signal $V_5$ represented in the shadow coordinate system is transformed to a signal of the world coordinate system by the transformation matrix F shown by the equation (42). Thereby, the 3-D shadow video signal $V_5$ represented with the coordinate value of the world coordinate system can be obtained.

The processing shown in the flow of FIG. 11B will be summarized. The processing for obtaining the 3-D shadow video signal $V_5$ of the world coordinate system from the 3-D object video signal $V_1$ of the world coordinate system comprises: a step (SP15) of transforming the 3-D object video signal $V_1$ from the world coordinate system to the shadow coordinate system; a step (SP16, SP17, and SP18) of projecting the 3-D object video signal onto the $X_S$-$Y_S$ plane of the shadow coordinate system in the shadow coordinate system to produce the 3-D shadow video signal of the shadow coordinate system; and a step (SP19) of transforming the 3-D shadow video signal of the shadow coordinate system from the shadow coordinate system to the world coordinate system to obtain the 3-D shadow video signal $V_5$ of the world coordinate system.

Therefore, the perspective transformation matrix $P_{PARA}$ for obtaining the 3-D shadow video signal $V_5$ of the world coordinate system from the 3-D object video signal $V_1$ of the world coordinate system can be represented by the multiplication among the transformation matrix $F^{-1}$, the rotational matrix $R_Z(-\alpha')$, the perspective transformation matrix $P_{S0}''$, and the rotational matrix $R_Z(\alpha')$, and the transformation matrix $F^{-1}$.

$$P_{PARA} = F^{-1} \cdot R_Z(-\alpha') \cdot P_{S0}'' \cdot R_Z(\alpha') \cdot F \quad (69)$$

By substituting the transformation matrix $P_{PARA}$ for the equation (60), the transformation matrix $T_{shadow}''$ for obtaining the 2-D shadow video signal $V_4$ from the 2-D source video signal at the parallel light source mode can be represented as the following equation.

$$T_{shadow}'' = T_0 \cdot P_{PARA} \cdot P_0$$

$$T_0 \cdot F^{-1} \cdot R_Z(-\alpha') \cdot P_{S0}'' \cdot R_Z(\alpha') \cdot F \cdot P_0 \quad (70)$$

Here, the calculation method based on the transformation matrix $T_{shadow}''$ of calculating the read address for reading the 2-D shadow video signal $V_6$ from the frame memory 22 is completely the same as the calculation method based on the matrix $T_{obj}$ shown in the equation (3) of obtaining the read address $(X_M, Y_M)$ for reading the 2-D object video signal $V_2$ from the frame memory 12. That is, the calculation is completely the same as the calculations shown by the equations (3) to (14).

Specifically, since the matrix $T_{shadow}''$ is a matrix having four rows and four lines, as with the equation (4), with a matrix excluding the constituents (third row and third line) of the Z-axis direction as a $T_{33shadow}''$, each parameter of an inverse matrix $(T_{33shadow}'')^{-1}$ to the transformation matrix $T_{33shadow}''$ is defined as the following equation.

$$(T_{33shadow}'')^{-1} = \begin{bmatrix} b_{11}'' & b_{12}'' & b_{13}'' \\ b_{21}'' & b_{22}'' & b_{23}'' \\ b_{31}'' & b_{32}'' & b_{33}'' \end{bmatrix} \quad (71)$$

In addition, the read address to be supplied from the read address generating circuit 24 of the shadow signal generating section 20 is defined as $(X_M'', Y_M'')$. With reference to the calculation method from the equation (3) to the equation (14), the read address $(X_M'', Y_M'')$ can be represented as the following equations.

$$X_M'' = \frac{b_{11}'' X_S + b_{21}'' Y_S + b_{31}''}{b_{13}'' X_S + b_{23}'' Y_S + b_{33}''} \quad (72)$$

$$Y_M'' = \frac{b_{12}'' X_S + b_{22}'' Y_S + b_{32}''}{b_{13}'' X_S + b_{23}'' Y_S + b_{33}''} \quad (73)$$

Therefore, the read address $(X_M'', Y_M'')$ which is supplied to the frame memory 22 can be represented by using the respective parameters ("$r_{11}$" to "$r_{33}$", "$l_x$", "$l_y$", "$l_z$", and "s") of the 3-D transformation matrix $T_0$ decided by the spatial image transformation processing desired by the operator, the perspective value $P_z$ set beforehand, the position $(x_L, y_L, z_L)$ of the point light source, the rotational angles $(\theta_X, \theta_Y, \theta_Z)$ of respective axes in the shadow coordinate system, and the origin $(x_{S0}, y_{S0}, z_{S0})$ of the shadow coordinate system.

Therefore, if the screen address $(X_S, Y_S)$ for addressing so as to correspond to the order of the raster scan of the monitor screen 3 is supplied to the equations (6) to (40), and the read address $(X_M'', Y_M'')$ on the frame memory 22 corresponding to the supplied screen address can be calculated successively. Thereby, the 2-D shadow video signal $V_6$ corresponding to the 2-D object video signal $V_2$ can be produced.

(7) Explanation about setting the shadow coordinate system

Figure 15A:
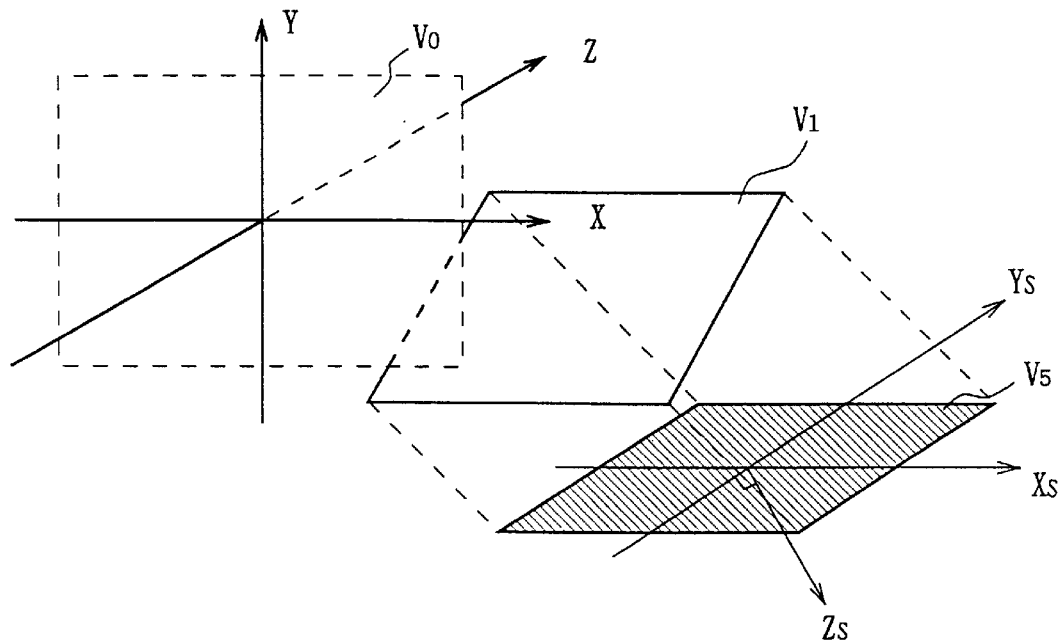
FIG. 15 is a drawing explaining an origin setting mode for automatically setting the origin of the shadow coordinate system.

As described above, in order to set the shadow coordinate system for providing the shadow plane on which a shadow for an object video signal is projected, it is necessary that respective rotational angles $(\theta_X, \theta_Y, \theta_Z)$ of the $X_S$-axis, the $Y_S$-axis, and the $Z_S$-axis of the shadow coordinate system for the X-axis, the Y-axis, and the Z-axis of the world coordinate system and the origin $(x_{S0}, y_{S0}, z_{S0})$ of the shadow coordinate system for the origin of the world coordinate system are set. In the special effect apparatus of the present invention, as described above, the operator arbitrarily sets the respective rotational angles of the $X_S$-axis, the $Y_S$-axis, and the $Z_S$-axis of the shadow coordinate system and the origin of the shadow coordinate system. The rotational angles $(\theta_X, \theta_Y, \theta_Z)$ of respective axes and the origin $(x_{S0}, y_{S0}, z_{S0})$ are substituted for the equations (42) and (47). However, if the operator sets an unfounded position as the origin of the shadow coordinate system, the 3-D transformed object video signal $V_1$ and the 3-D shadow video signal $V_5$ may be spatially separated each other as shown in FIG. 15A. This reason is that the 3-D object video signal $V_1$ does not exist on the shadow plane, that is, in other words, the shadow plane can not be set such that the 3-D object video signal $V_1$ exists on the shadow plane. As a matter of course, if the operator desires the shadow plane shown in FIG. 15A, there is not a problem. However, in order to obtain an effect to attach a shadow to an object, which exists on the ground, by a light emitted from a light source, it is necessary that the ground is set as a shadow plane on which the shadow is projected. That is, it is necessary that the origin of the shadow coordinate system is set so that the 3-D object video signal $V_1$ spatially exists on the shadow plane. Therefore, the spatial effect apparatus of the present invention has an origin setting mode for automatically setting the origin of the shadow coordinate system.

In the origin setting mode, the operator designates a point which exists on the source video signal $V_0$ at first. Then, the designated point is transformed on the 3-D space by the 3-D transformation matrix $T_0$ in order to set a point on the 3-D transformed object video signal $V_{obj}$ corresponding to the designated point as the origin of the shadow coordinate system. Therefore, the origin of the shadow coordinate system is set to a point on the 3-D object video signal $V_{obj}$, so that the 3-D object video signal $V_{obj}$ exists on the shadow plane.

Figure 15B:
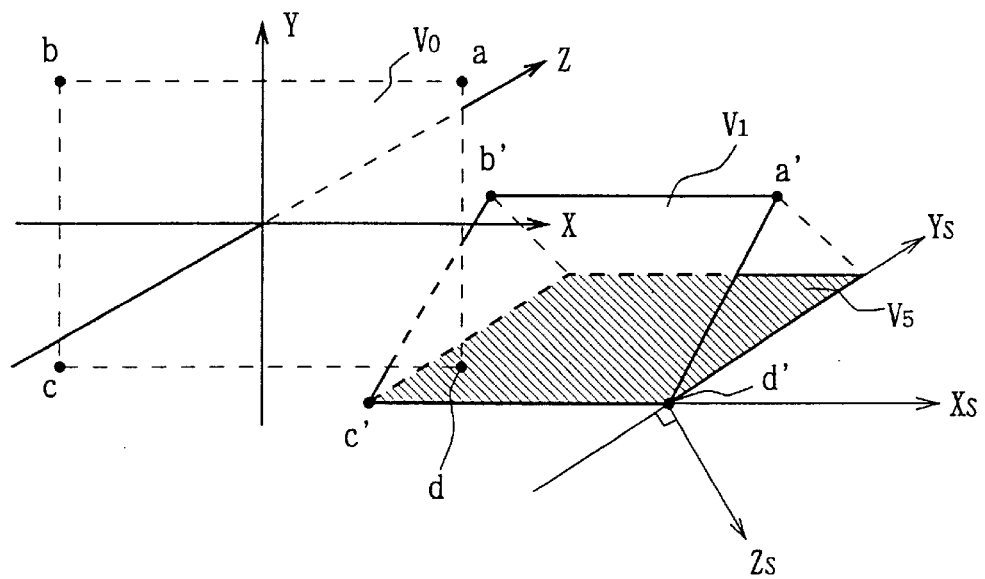

Specifically, as shown in FIG. 15B, it is assumed that a point which is above the source video signal $V_0$ off to the right is "a", a point which is above it off to the left is "b", a point which is under it off the right is "c", a point which is under it off the left is "d", and respective points on the 3-D object video signal $V_{obj}$ corresponding to them are "a'", "b'", "c'", and "d'". In addition, it is assumed that respective coordinates of "a", "b", "c", and "d" on the source video signal $V_0$ are $(x_a,y_a,0)$, $(x_b,y_b,0)$, $(x_c,y_c,0)$, and $(x_d,y_d,0)$ and respective coordinates of "a'", "b'", "c'", and "d'" on the 3-D object video signal Vobj are $(x_a',y_a',z_a')$, $(x_b',y_b',z_b')$, $(x_c',y_c',z_c')$, and $(x_d',y_d',z_d')$.

Next, the case where the operator designates the point "d" on the source video signal $V_0$ will be described. The point d $(x_d,y_d,0)$ on the source video signal designated by the operator becomes the point d' $(x_d',y_d',z_d')$ on the object video signal $V_{obj}$ by transforming the point d by the 3-D transformation matrix $T_0$. Here, the point d $(x_d,y_d,0)$ and the point d' $(x_d',y_d',z_d')$ are respectively represented as a vector $[x_d \ y_d \ 0 \ 1]$ and a vector $[x_d' \ y_d' \ z_d' \ 1]$ representing with the vector of the homogeneous coordinate, therefore, the relation between these vectors and the 3-D transformation matrix $T_0$ can be represented as the following equation.

$$[x_d' \ y_d' \ z_d' \ 1] = [x_d \ y_d \ 0 \ 1] \cdot T_0 \qquad (74)$$

$$= [x_d \ y_d \ 0 \ 1] \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix}$$

Therefore, the following relation can be obtained by the equation (73).

$$x_d'=(r_{11}x_d+r_{21}y_d+l_x)/s$$
$$y_d'=(r_{21}x_d+r_{22}y_d+l_y)/s \qquad (75)$$
$$z_d'=(r_{13}x_d+r_{23}i_d+l_z)/s$$

The point $(x_d',y_d',z_d')$ obtained by the equation (74) is substituted for the origin $(x_{S0},y_{S0},z_{S0})$ of the shadow coordinate system being a parameter of the transformation matrix L shown in the equations (42) and (47), thereby the origin of the shadow coordinate system is set on the 3-D object video signal $V_1$. That is, the shadow coordinate system is set on the 3-D space so that the 3-D object video signal $V_1$ exists on the shadow plane. Accordingly, the special effect apparatus of the present invention can obtain a natural effect so that a shadow of an object existing on the ground is projected on the surface on the earth by the light emitted from the sun.

(8) Explanation of movement and effect of the special effect apparatus

Next, the movement of the special effect apparatus and the effect of the present invention will be described.

First, the operator operates a 3-D pointing device, a key, or the like, provided on the control panel 5 to input respective parameters necessary for the calculation of the read address which is used in the special effect apparatus of the present invention. The parameters necessary for the calculation of the read address are a perspective value $P_z$, the respective rotational angles $(\theta_X, \theta_Y, \theta_Z)$ of the $X_S$-axis, the $Y_S$-axis, and the $Z_S$-axis of the shadow coordinate system, the origin $(x_{S0},y_{S0},z_{S0})$ of the shadow coordinate system, the type of the light source showing whether the parallel light source or the point light source, the position $(x_L,y_L,z_L)$ or $(\gamma,\alpha,\beta)$ of the light source, and so on. In the case of designating a mode for automatically setting the origin of the shadow coordinate system, data showing which is designated out of the four corners (a to d) of the source video signal is input from the control panel 5.

First, as the type of the light source, the case where the point light source is designated will be described.

The CPU 8 receives these parameters which are input from the control panel 5 to reflect in the calculation of the read address at real time. Specifically, the CPU 8 controls the change of the parameters supplied from the control panel 5 for each frame and calculates parameters ($b_{11}$ to $b_{33}$, $b_{11}'$ to $b_{33}'$) for calculating the read address on the basis of the supplied parameters for each frame. Therefore, these parameters can be changed at real time according to the operation of the operator, and then the read address is calculated at real time according to the changed parameters. In addition, in the CPU 8, these parameters can be stored as setting values in a RAM 7 for each frame. Note that, at this time, the operator does not instruct the source video signal $V_0$ to perform the 3-D image transformation, so that the source video signal $V_0$ is displayed on the monitor screen 3.

Next, the operator instructs the source video signal $V_0$ to perform the 3-D image transformation operation by operating such the 3-D pointing device provided in the control panel 5. When the operator instructs to perform the 3-D image transformation, the CPU 8 receives the parameters "$r_{11}$" to "$r_{33}$", "$l_X$", "$l_Y$", "$l_Z$", and "s" of the 3-D transformation matrix $T_0$, designated by the operator, from the control panel 5 in order to reflect these parameters in the calculation of the read address at real time. Specifically, the CPU 8 monitors the change of these parameters supplied from the control panel 5 for each frame, and calculates the parameters ($b_{11}$ to $b_{33}$, $b_{11}'$ to $b_{33}'$) for calculating the read address on the basis of the supplied parameters for each frame. Next, the CPU 8 controls the parameters "$b_{11}$" to "$b_{33}$" of the 3-D transformation matrix $T_{33}^{-1}$ represented in the equation (8) on the basis of the received parameters "$r_{11}$" to "$r_{33}$", "$l_X$", "$l_Y$", "$l_Z$", and "s". specifically, the parameters "$r_{11}$" to "$r_{33}$", "$l_X$", "$l_Y$", "$l_Z$", and "s" are substituted for the equations (28) to (37), thereby the parameters $b_{11}$ to $b_{33}$ can be obtained. Further, the CPU 8 receives the parameters "$r_{11}$" to "$r_{33}$", "$l_X$", "$l_Y$", "$l_Z$", and "s" of the received 3-D transformation matrix $T_0$, the parameters "$\theta_X$", "$\theta_Y$", "$\theta_Z$", "$x_{S0}$", "$y_{S0}$", "$z_{S0}$" on the shadow coordinate, and the parameters "$x_L$", "$y_L$", and "$z_L$" on the light source in order to calculate the parameters "$b_{11}'$" to "$b_{33}'$" of the 3-D transformation matrix $(T_{33shadow}')^{-1}$ represented in the equation (57) on the basis of these parameters. The CPU 8 supplies the calculated parameters "$b_{11}$" to "$b_{33}$" to the read address generating circuit 14 of the object signal producing section 10, and supplies the calculated parameters "$b_{11}'$" to "$b_{33}'$" to the read address generating circuit 24 of the shadow signal producing section 20.

The read address generating circuit 14 of the object signal producing section 10 receives the parameters "$b_{11}$" to "$b_{33}$"

from the CPU 8 and receives the screen address ($X_S, Y_S$) from the screen address generating circuit 9, in order to produce the read address ($X_M, Y_M$) for object signal on the basis of the equations (13) and (14) for each frame. The produced read address ($X_M, Y_M$) is supplied to the frame memory 12 for video signal and the frame memory 13 for key signal, as a result, the object video signal $V_2$ is output from the frame memory 12 and the object key signal $K_2$ is output from the frame memory 13.

On the other hand, the read address generating circuit 24 of the shadow signal producing section 20 receives the parameters "$b_{11}$" to "$b_{33}$" from the CPU 8 and receives the screen address ($X_S, Y_S$) from the screen address generating circuit 9, in order to produce the read address ($X_M', Y_M'$) for shadow signal on the basis of the equations (58) and (59) for each frame. The produced read address ($X_M', Y_M'$) is supplied to the frame memory 22 for video signal and the frame memory 23 for key signal, as a result, as shown in FIG. 7B, the shadow video signal $V_4$ is output form the frame memory 22 and the shadow key signal $K_4$ is output from the frame memory 23.

The first mixer 30 receives the object video signal $V_2$ and the object key signal $K_2$ from the object signal producing section 10 and receives the shadow video signal $V_4$ and the shadow key signal $K_4$ from the shadow signal producing section 20, in order to produce the mixed video signal $V_{MIX}'$ and the mixed key signal $K_{MIX}'$ on the basis of the equation (a).

The second mixer 40 receives the background video signal $V_{BK}$ supplied from the external apparatus and the mixed video signal $V_{MIX}'$ and the mixed key signal $K_{MIX}'$ output from the first mixer 30 in order to produce the output video signal $V_{OUT}'$ on the basis of the equation (c).

Next, the case where the parallel light source is designated as the light source will be described.

The CPU 8 receives the parameters ($\theta_X$, $\theta_Y$, $\theta_Z$) on respective axes of the shadow coordinate, the parameters ($x_{S0}, y_{S0}, z_{S0}$) on the origin of the shadow coordinate, and the parameters ($\Gamma$, $\alpha$, $\beta$) on the parallel light source from the control panel 5. In addition, the CPU 8 receives the parameters "$r_{11}$" to "$r_{33}$", "$l_X$", "$l_Y$", "$l_Z$", and "s" of the 3-D transformation matrix $T_0$ from the control panel 5 on the basis of the operation state of the 3-D pointing device provided in the control panel 5. The CPU 8 controls the change of these parameters supplied from the control panel 5 at real time for each frame, and calculates the parameters ($b_{11}$ to $b_{33}$, and $b_{11}"$ to $b_{33}"$) for calculating the read address on the basis of the supplied parameters for each frame. Therefore, these parameters can be changed according to the operation of the operator at real time for each frame, and the read address can be calculated according to the changed parameters at real time.

Next, the CPU 8 calculates the parameters "$b_{11}$" to "$b_{33}$" of the 3-D transformation matrix $T_{33}^{-1}$ represented in the equation (8) on the basis of the received parameters "$r_{11}$" to "$r_{33}$", "$l_X$", "$l_Y$", "$l_Z$", and "s". specifically, the parameters "$r_{11}$" to "$r_{33}$", "$l_X$", "$l_Y$", "$l_Z$", and "s" are substituted for the equations (28) to (37), thereby the parameters "$b_{11}$" to "$b_{33}$" can be obtained. Further, the CPU 8 receives the parameters "$r_{11}$" to "$r_{33}$", "$l_X$", "$l_Y$", "$l_Z$", and "s" of the received 3-D transformation matrix $T_0$, the parameters "$\theta_X$", "$\theta_Y$", "$\theta_Z$", "$x_{S0}$", "$y_{S0}$", "$z_{S0}$" on the shadow coordinate, and the parameters "$\Gamma$", "$\alpha$", "$\beta$" on the light source, in order to calculate the parameters "$b_{11}""$" to "$b_{33}""$" of the 3-D transformation matrix $(T_{33shadow}")^{-1}$, represented in the equation (71), on the basis of these parameters. The CPU 8 supplies the calculated parameters $b_{11}$ to $b_{33}$ to the read address generating circuit 14 of the object signal producing section 10 and supplies the calculated parameters "$b_{11}""$" to "$b_{33}""$" to the read address generating circuit 24 of the shadow signal producing section 20.

The read address generating circuit 14 of the object signal generating section 10 receives the parameters "$b_{11}$" to "$b_{33}$" from the CPU 8 and receives the screen address ($X_S, Y_S$) from the screen address generating circuit 9, in order to produce the read address ($X_M, Y_M$) for object signal on the basis of the equations (13) and (14) for each frame. The produced read address ($X_M, Y_M$) is supplied to the frame memory 12 for video signal and the frame memory 13 for key signal, as a result, the object video signal $V_2$ is output from the frame memory 12 and the object key signal $K_2$ is output from the frame memory 13.

On the other hand, the read address generating circuit 24 of the shadow signal producing section 20 receives the parameters "$b_{11}'"$" to "$b_{33}'"$" from the CPU 8 and receives the screen address ($X_S, Y_S$) from the screen address generating circuit 9, in order to produce the read address ($X_M", Y_M"$) for shadow signal on the basis of the equations (72) and (73) for each frame. The produced read address ($X_M", Y_M"$) is supplied to the frame memory 22 for video signal and the frame memory 23 for key signal, as a result, as show in FIG. 10B, the shadow video signal $V_6$ is output from the frame memory 22 and the shadow key signal $K_6$ is output from the frame memory 23.

The first mixer 30 receives the object video signal $V_2$ and the object key signal $K_2$ from the object signal producing section 10 and receives the shadow video signal $V_6$ and the shadow key signal $K_6$ from the shadow signal producing section 20, in order to produce the mixed video signal $V_{MIX}"$ and the mixed key signal $K_{MIX}"$ on the basis of the equation (b).

The second mixer 40 receives the background video signal $V_{BK}$ supplied from the external apparatus and the mixed video signal $V_{MIX}"$ and the mixed key signal $K_{MIX}"$ output from the first mixer 30, in order to produce the output video signal $V_{OUT}"$ on the basis of the equation (d).

According to the aforementioned special effect apparatus, the suitable shadow can be easily attached to the object video signal without relying the experience of the operator. Further, the shadow video signal can be automatically producing coupled to the spatial movement of the object video signal.

Specifically, the special effect apparatus of the present invention produces the virtual 3-D object video signal by performing the 3-D image transformation for the source video signal and produces the 2-D object video signal by projecting the virtual 3-D object video signal onto the screen. Further, the virtual 3-D shadow signal is produced by projecting the 3-D video signal onto the shadow plane set beforehand, and the 2-D shadow signal is produced by projecting the virtual 3-D shadow signal onto the screen. Therefore, the 2-D shadow signal corresponding to the produced 2-D object signal can be automatically produced, and the operational efficiency of the operator can be improved. Further, since the 2-D shadow signal is produced by the calculation of the 3-D image transformation matrix, the project transformation matrix onto the shadow plane, and the project transformation matrix onto the screen plane, the natural shadow video signal $V_{shadow}$ for the object video signal Vobj can be produced without relying the operational experience of the operator as shown in FIG. 16A, so that the compatible 3-D image can be created.

Figure 16A:
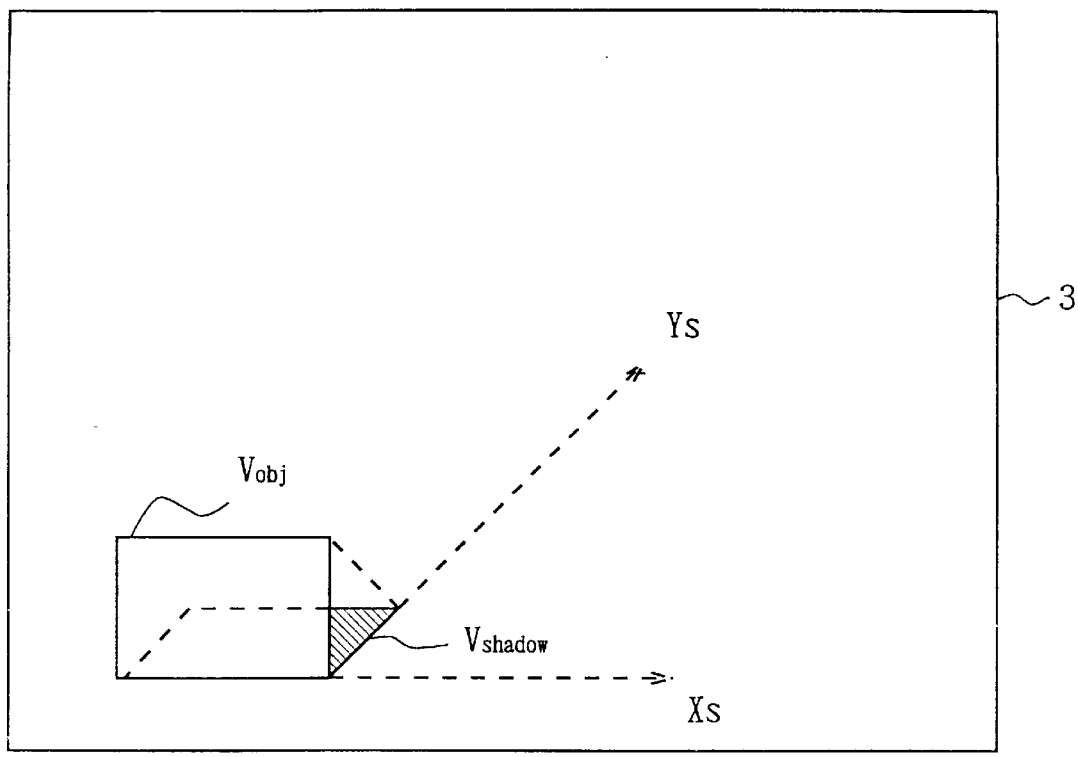
FIG. 16 is a drawing explaining the effect of the special effect apparatus of the present invention.
Figure 16B:
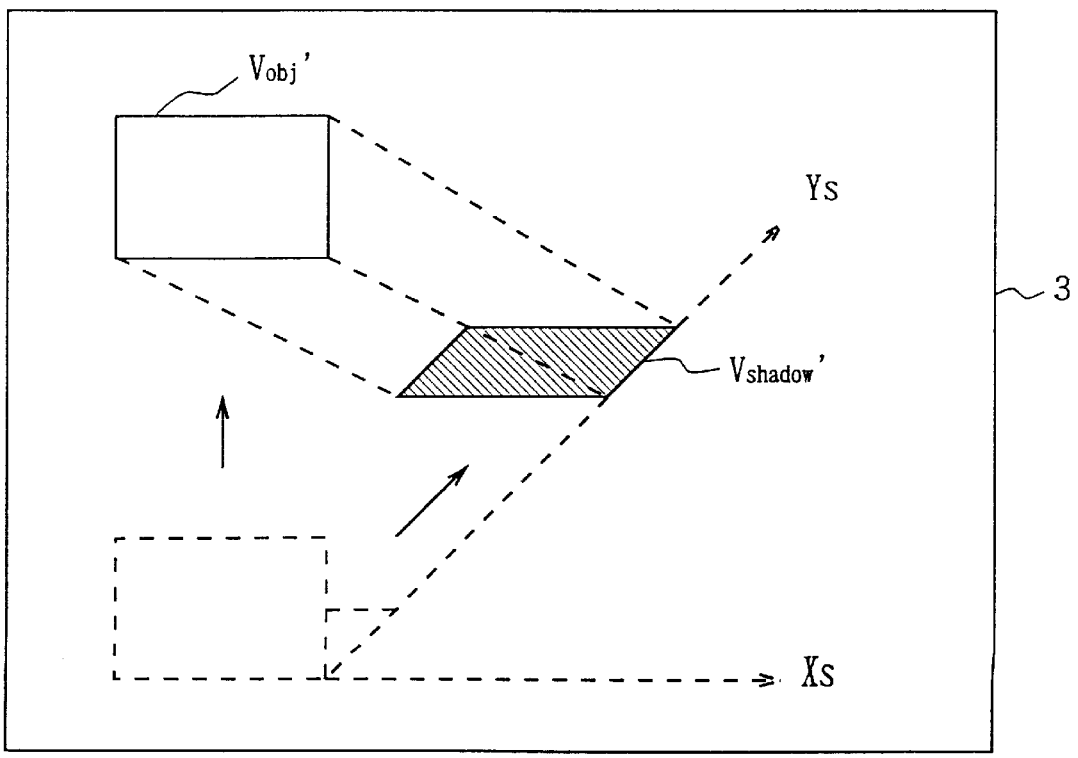

Further, as shown in FIG. 16B, in the case where the object video signal $V_{obj}$ is moved at a position of the object video signal $V_{obj}'$ on the 3-D space by operating the 3-D pointing device of the control panel by the operator, the CPU observes the parameters from the control panel for each frame, and calculates the read address for producing the shadow video signal $V_{shadow}$ on the basis of the supplied parameters for each frame, so that the shadow video signal $V_{shadow}$ is moved at a position of the shadow video signal $V_{shadow}'$ which exists on the shadow plane coupled to the movement of the object video signal $V_{obj}$ in the 3-D space. That is, the shadow video signal $V_{shadow}$ coupled to the movement of the object video signal $V_{obj}$ can be easily produced at real time.

Therefore, if the object video signal $V_{obj}$ moves from the state shown by FIG. 16A to the state shown by FIG. 16B, the shadow video signal $V_{shadow}$ also moves on the shadow plane coupled to the movement, so that the effect can be obtained when the shadow plane is assumed as the ground as if the object rises from the ground toward the sky.

Further, the special effect apparatus of the present invention, the point light source or the parallel light source can be set as the type of the light source for producing the shadow video signal $V_{shadow}$, and modes for calculating the shadow video signal $V_{shadow}$ according to the set light source are provided, so that the natural shadow corresponding to the light source can be produced. FIG. 16A and FIG. 16B are examples of spatially moving the object video signal, however, the object video signal $V_{obj}$ may be fixed in the 3-D space and the position of the light source may be spatially moved.

Furthermore, the special effect apparatus of the present invention has the origin setting mode for setting the shadow plane, so that the shadow plane can be set so that the 3-D transformed object spatially exists on the shadow plane. Therefore, considering the shadow plane as the ground, the object which exists on the ground can be represented.

We claim:

1. A special video effect apparatus which performs a special video transformation for a source video signal, said apparatus comprising:

video processing means for performing a spatial video transformation on said source video signal to produce a transformed video signal based on 3-D video transform parameters; and shadow producing means for performing a shadow transformation on said source video signal to produce a transformed shadow signal based on shadow transform parameters, said shadow transform parameters are associated with said 3-D video transform parameters so that said shadow transformation corresponds to said video spatial transformation, wherein an algorithm of said spatial video transformation comprises 3-D video transformation algorithm for performing 3-D video transformation on said source video signal to produce a virtual 3-D video signal and a first perspective transformation algorithm for performing a first perspective transformation on said virtual 3-D video signal to produce said transformed video signal; and wherein, an algorithm of said shadow transformation comprises said 3-D video transformation algorithm, a second perspective transformation algorithm for performing a second perspective transformation on said virtual 3-D video signal to produce a virtual 3-D shadow signal, and said first perspective transformation algorithm for generating said transformed shadow signal.

2. The special video effect apparatus according to claim 1, wherein said first perspective transformation is a transformation for projecting said virtual 3D video signal and said virtual 3D shadow signal onto a screen plane, and wherein said second perspective transformation is a transformation for projecting said virtual 3D video signal onto a shadow plane.

3. The special video effect apparatus according to claim 2, wherein said second perspective transformation algorithm includes transformation matrix for transforming a coordinate system between a world coordinate system defined by said screen plane and a shadow coordinate system defined by said shadow plane.

4. The special video effect apparatus according to claim 1, wherein said matrix for performing said second perspective transformation is selected based on the kinds of light sources.

5. A method of performing a special video transformation for a source video signal, the method comprising the steps of:

performing a spatial video transformation on said source video signal to produce a transformed video signal based on 3-D video transform parameters; and performing a shadow transformation on the source video signal to produce a transformed shadow signal based on shadow transform parameters, the shadow transform parameters are associated with the 3-D video transform parameters so that the shadow transformation corresponds to the video spatial transformation, wherein an algorithm of said spatial video transformation comprises 3-D video transformation algorithm for performing 3-D video transformation on said source video signal to produce a virtual 3-D video signal and a first perspective transformation algorithm for performing a first perspective transformation on said virtual 3-D video signal to produce said transformed video signal; and wherein, an algorithm of said shadow transformation comprises said 3-D video transformation algorithm, a second perspective transformation algorithm for performing a second perspective transformation on said virtual 3-D video signal to produce a virtual 3-D shadow signal, and said first perspective transformation algorithm for generating said transformed shadow signal.

* * * * *